US012592217B2

(12) United States Patent
Qureshi et al.

(10) Patent No.: US 12,592,217 B2
(45) Date of Patent: Mar. 31, 2026

(54) SYSTEM AND METHOD FOR SPEECH PROCESSING

(71) Applicant: Spotify AB, Stockholm (SE)

(72) Inventors: Zeenat Qureshi, London (GB); Felix Vaughan, London (GB); John Flynn, London (GB)

(73) Assignee: Spotify AB, Stockholm (SE)

( * ) Notice: Subject to any disclaimer, the term of this patent is extended or adjusted under 35 U.S.C. 154(b) by 379 days.

(21) Appl. No.: 18/174,120

(22) Filed: Feb. 24, 2023

(65) Prior Publication Data

US 2023/0252971 A1 Aug. 10, 2023

Related U.S. Application Data

(63) Continuation of application No. PCT/GB2021/052242, filed on Aug. 27, 2021.

(30) Foreign Application Priority Data

Aug. 28, 2020 (GB) ..................................... 2013585

(51) Int. Cl.
*G10L 13/047* (2013.01)
*G10L 13/08* (2013.01)

(52) U.S. Cl.
CPC ............ *G10L 13/047* (2013.01); *G10L 13/08* (2013.01)

(58) Field of Classification Search
CPC ....... G10L 13/047; G10L 13/08; G10L 13/00; G10L 13/04

(Continued)

(56) References Cited

U.S. PATENT DOCUMENTS 9,508,341 B1 11/2016 Parlikar et al.
11,289,069 B2 * 3/2022 Li ............................ G06N 7/00

(Continued)

OTHER PUBLICATIONS

Fang et al. ("Towards Transfer Learning for End-to-End Speech Synthesis from Deep Pre-Trained Language Models" (Year: 2019).*

(Continued)

*Primary Examiner* — Paras D Shah
*Assistant Examiner* — Fouzia Hye Solaiman
(74) *Attorney, Agent, or Firm* — Morgan, Lewis & Bockius LLP

(57) ABSTRACT

A method for training a speech synthesis model adapted to output speech in response to input text is provided. The method includes receiving training data for training said speech synthesis model, the training data comprising speech that corresponds to known text. The method includes training said speech synthesis model. The method includes testing said speech synthesis model using a plurality of text sequences. The method includes calculating at least one metric indicating the performance of the model when synthesising each text sequence. The method includes determining from said metric whether the speech synthesis model requires further training. The method includes determining targeted training text from said calculated metrics, wherein said targeting training text is text related to text sequences where the metric indicated that the model required further training. And the method includes outputting said determined targeted training text with a request further speech corresponding to the targeted training text.

17 Claims, 14 Drawing Sheets

(58) Field of Classification Search
USPC .......................................................... 704/259
See application file for complete search history.

(56) References Cited

U.S. PATENT DOCUMENTS

| | | | | |
|---|---|---|---|---|
| 2005/0256716 | A1 | 11/2005 | Bangalore et al. | |
| 2014/0114663 | A1* | 4/2014 | Lin | G10L 13/033 704/260 |
| 2019/0295531 | A1* | 9/2019 | Rao | G10L 15/26 |
| 2022/0020357 | A1* | 1/2022 | Rastrow | G10L 15/1822 |
| 2022/0051654 | A1* | 2/2022 | Finkelstein | G10L 13/10 |
| 2022/0059072 | A1* | 2/2022 | Zhang | G10L 13/047 |

OTHER PUBLICATIONS

Sonantic Limited, GB Search Report under Section 7, GB2013585.1, Feb. 24, 2021, 1 pg.
Sonantic Limited, International Search Report and Written Opinion, PCT/GB2021/052242, Nov. 30, 2021, 15 pgs.
Spotify AB, Intention to Grant, EP21769174.0, Feb. 12, 2024, 9 pgs.

* cited by examiner

SYSTEM AND METHOD FOR SPEECH PROCESSING

RELATED APPLICATIONS

This application is a continuation of International Application No. PCT/GB2021/052242 filed Aug. 27, 2021, which claims priority to U.K. Application No. GB2013585.1, filed Aug. 28, 2020; each of which is hereby incorporated by reference in its entirety.

FIELD

Embodiments described herein relate to a system and method for speech processing.

BACKGROUND

Text-to-speech (TTS) synthesis methods and systems are used in many applications, for example in devices for navigation and personal digital assistants. TTS synthesis methods and systems can also be used to provide speech segments that can be used in games, movies or other media comprising speech.

The training of such systems requires audio speech to be provided by a human. For the output to sound particularly realistic, professional actors are often used to provide this speech data as they are able to convey emotion effectively in their voices. However, even with professional actor, many hours of training data is required.

BRIEF DESCRIPTION OF DRAWINGS

Embodiments described herein will now be explained with reference to the following figures in which:

FIG. 6(*b*) shows a schematic illustration of the training of a Vocoder in accordance with an embodiment;

FIG. 6 (*c*) shows a schematic illustration of the training of a Vocoder in accordance with another embodiment;

DETAILED DESCRIPTION OF EMBODIMENTS

Figure 1:
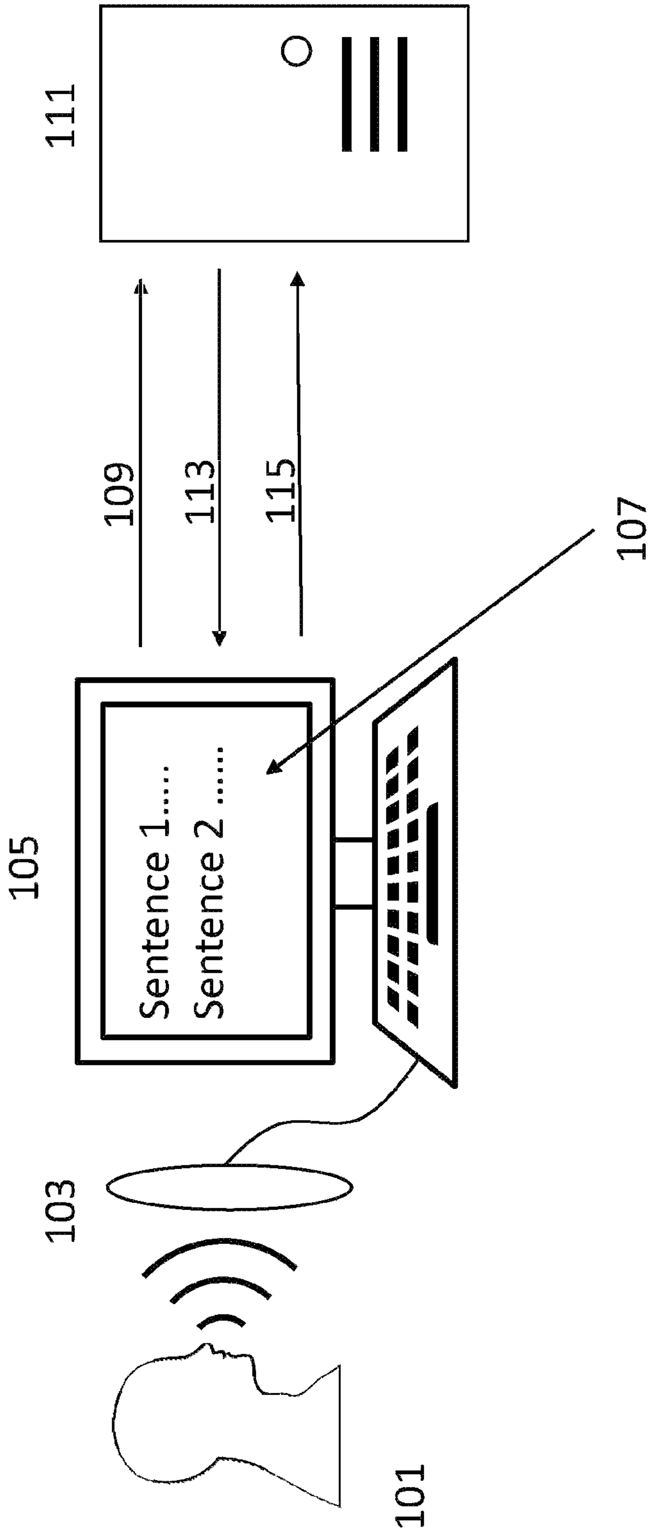
FIG. 1 is an overview of a system in accordance with an embodiment.

According to a first embodiment, a computer implemented method for training a speech synthesis model is provided, wherein the speech synthesis model is adapted to output speech in response to input text the method comprising:

- receiving training data for training said speech synthesis model, the training data comprising speech that corresponds to known text;
- training said speech synthesis model;
- testing said speech synthesis model using a plurality of text sequences;
- calculating at least one metric indicating the performance of the model when synthesising each text sequence; and
- determining from said metric whether the speech synthesis model requires further training;
- determining targeted training text from said calculated metrics, wherein said targeting training text is text related to text sequences where the metric indicated that the model required further training; and
- outputting said determined targeted training text with a request further speech corresponding to the targeted training text.

The disclosed system provides an improvement to computer functionality by allowing computer performance of a function not previously performed by a computer. Specifically, the disclosed system provides for a computer to be able to test a speech synthesis model and if the testing process indicates that the speech synthesis model is not sufficiently trained, specify further, targeted, training data and send this to an actor to provide further data. This provides efficient use of the actor's time as they will only be asked to provide data in the specific areas where the model is not performing well. This in turn will also reduce the amount of training time needed for the speech synthesis model since the model receives targeting training data.

The above method is capable of not only training a speech synthesis model, but automatically testing the speech synthesis model. If the speech synthesis model is performing poorly, the testing method is capable of identifying the text that causes problems and then generates targeted training text so that the actor can provide training data (i.e. speech corresponding to the targeted training text) that directly improves the model. This will reduce the amount of training data that the actor will need to provide to the model both saving the actor's voice, but also reducing the total training time of the model as there is feedback to guide the training data to directly address the areas where the model is weak.

For example, as a very simplified example, if the model is trained for angry speech, but it is recognised that the model is struggling to output high quality speech for sentences containing, for example, fricative consonants, the targeted training text can contain sentences with fricative consonants.

The model can be tested to determine its performance against a number of assessments. For example, the model can be tested to determine its accuracy, the "human-ness" of the output, the accuracy of the emotion expressed by the speech.

In an embodiment, the training data is received from a remote terminal. Further, outputting of the targeted training text comprises sending the determined targeted training text to the remote terminal.

In an embodiment, a computer implemented method is provided for testing a speech synthesis model is provided, wherein the speech synthesis model is adapted to output speech in response to input text the method comprising:

- testing said speech synthesis model using a plurality of text sequences;
- calculating at least one metric indicating the performance of the model when synthesising each text sequence; and
- determining from said metric whether the speech synthesis model requires further training.

In an embodiment, determining whether said speech synthesis model required further training comprises combining the metric over a plurality of test sequences and determining whether the combined metric is below a threshold. For example, if each text sequence receives a score, then the scores for a plurality of text sequences can be averaged.

In an embodiment, calculating at least one metric comprises calculating a plurality of metrics for each text sequence and determining whether further training is needed for each metric. For example, the plurality of metrics may comprise at least one or more derived from the output of the said synthesis model for a text sequence and the intermediate outputs of the model during synthesis of a text sequence. The intermediate outputs can be, for example, alignments, mel-spectrograms etc.

A metric that is calculated from the output of the synthesis, can be termed as a transcription metric where for each text sequence inputted into said synthesis model, the corresponding synthesised output speech is directed into a speech recognition module to determine a transcription; and the transcription is compared with that of the original input text sequence. The transcription and the original input text sequence are then compared using a distance measure, for example using the Levenshtein distance.

In a further embodiment, the speech synthesis model comprises an attention network and a metric derived from the intermediate outputs is derived from the attention network for an input sentence. The parameters derived from the attention network may comprise a measure of the confidence of the attention mechanism over time or coverage deviation.

In a further embodiment, a metric derived from the intermediate outputs is the presence or absence of a stop token in the synthesized output. From this, the presence or absence of a stop token is used to determine the robustness of the synthesis model, wherein the robustness is determined from the number of text sequences where a stop token was not generated during synthesis divided by the total number of sentences.

In a further embodiment, a plurality of metrics are used, the metrics comprising the robustness, a metric derived from the attention network and a transcription metric,

- wherein a text sequence is inputted into said synthesis model and the corresponding output speech is passed through a speech recognition module to obtain a transcription and the transcription metric is a comparison of the transcription with the original text sequence.

Each metric can be determined over a plurality of test sequences and compared with a threshold to determine if the model requires further training.

In a further embodiment, if it is determined that the model requires further training, a score is determined for each text sequence by combining the scores of the different metrics for each text sequence and the text sequences are ranked in order of performance.

A recording time can be set for recording further training data. For example, if the actor is contracted to provide 10 hours of training data and has already provided 9 hours, a recording time can be set at 1 hour. The number of sentences sent back to the actor can be determined to fit this externally determined recording time, for example, the n text sequences that performed worst are sent as the targeting training text, wherein n is selected as the number of text sequences that are estimated to the take the recording time to record.

The training data may comprises speech corresponding to distinct text sequences or the training data comprises speech corresponding to a text monologue.

In an embodiment, the training data is audio received from an external terminal. This may sent from an external terminal with the corresponding text file or the audio may be sent back on its own and matched with its corresponding text for training, the matching being possible since the timing when an actor recorded audio corresponding to text is known.

In a further embodiment, a carrier medium carrying computer readable instructions is provided that is adapted to cause a computer to perform the method of any preceding claim.

In a further embodiment, a system for training a speech synthesis model is provided, said system comprising a processor and memory, said speech synthesis model being stored in memory and being adapted to output speech in response to input text, the processor being adapted to

- receive training data for training said speech synthesis model, the training data comprising speech that corresponds to known text;
- train said speech synthesis model;
- test said speech synthesis model using a plurality of text sequences;
- calculate at least one metric indicating the performance of the model when synthesising each text sequence; and
- determine from said metric whether the speech synthesis model requires further training;
- determine targeted training text from said calculated metrics, wherein said targeting training text is text related to text sequences where the metric indicated that the model required further training; and
- output said determined targeted training text with a request further speech corresponding to the targeted training text.

FIG. 1 shows an overview of the whole system. FIG. 1 shows a human 101 speaking into a microphone 103 to provide training data. In an embodiment, a professional condenser microphone is used in an acoustically treated studio. However, other types of microphone could be used. From now on, the human will be referred to as an actor. However, it will be appreciated that the speech does not have to be supplied by an actor. The microphone is connected to the actor's terminal 105. The actor's terminal 105 is in communication with a remote server 111. In this embodiment, the actor's terminal is a PC. However, it could be a tablet, mobile telephone or the like.

The actor's terminal 105 collects speech spoken by the actor and sends this to the server 111. The server performs two tasks, it trains an acoustic model, the acoustic model being configured to output speech in response to a text input.

The server also monitors the quality of this acoustic model and, when appropriate, requests the actor 101, via the actor's terminal 105 to provide further training data. Further, the server 111 is configured to make a targeted request concerning the further training data required.

The acoustic model that will be trained using the system of FIG. 1 can be trained to produce output speech of a very high quality. An application is provided which runs on the actor's terminal that allows the actor to provide the training data.

When the actor first wishes to provide training data, they start the application. The application will run on the actor's terminal 105 and will provide a display indicating the type of speech data that the actor can provide. In an embodiment, the actor might be able to select between reading out individual sentences and a monologue.

In the case of individual sentences, as is exemplified on the screen of terminal 105, a single sentence is provided and the actor reads that sentence. The screen 107 may also provide directions as to how the actor should read the sentence, for example, in an angry voice, in an upset voice, et cetera. For different emotions and speaking styles separate models may be trained or a single multifunctional model may be trained.

In a different mode of operation, the actor is requested to read a monologue. In this embodiment, both modes are provided. The advantage of providing both modes is that a monologue allows the actor to use very natural and expressive speech, more natural and expressive than if the actor is reading short sentences. However, as will be explained later, the system needs to provide more processing if the actor is reading a monologue as it more difficult to associate the actor's speech with the exact text they read at any point in time compared to the situation where the actor is reading short sentences.

The description will first relate to the first mode of operation with the actor is reading short sentences. Differences to the second mode of operation where the actor reads a monologue will be described later.

Once the sentence appears on the monitor screen 107, the actor will read the sentence. The actors speech is picked up by microphone 103. In an embodiment, microphone 103 is a professional condenser microphone. In other embodiments, poorer quality microphones can be used initially (to save cost) then fine-tuning of the models can be achieved by training with a smaller dataset with a professional microphone.

Any type of interface may be used to allow the actor to use the system. For example, the interface may offer the actor the use of two keyboard keys. One to advance to the next line, one to go back and redo.

The collected speech signals are then sent back 109 to server 111. The operation of the server will be described in more detail with reference to FIG. 2. In an embodiment, the collected speech is sent back to the server, sentence by sentence. For example, once the "next key" is pressed the recently collected audio for the last displayed sentence is sent to the server. In an embodiment, there is a database server-side that keeps track of sentence-audio pairs using a unique identifier key for that pair. Audio is sent to the server on its own and the server can match that to the appropriate line in the database. In an embodiment, audio sent back is sent through a speech recogniser which transcribes the audio and checks that it matches closely, the text it should belong to (for example, using Levenshtein distance in phoneme space).

The basic training of the acoustic model within the server 111 will typically take about 1.5 hours of data. However, it is possible to train the basic model with less or more data.

Server 111 is adapted to monitor the quality of the trained acoustic model. Further, the server 111 is adapted to recognise how to improve the quality of the trained acoustic model. How this is done will be described with reference to FIG. 2.

If the server 111 requires further data, it will send 113 a message to the actor's terminal 105 providing sentences that allow the actor to provide the exact data that is necessary to improve the quality of the model.

For example, if there are specific words that are not being outputted correctly by the acoustic model, if the quality of the TTS is worse at expressing certain emotions, sentences that address the specific issue of sent back to the actor's terminal 105 for the actor to provide speech data to improve the model.

The text-to-speech synthesiser model is designed to generate expressive speech that conveys emotional information and sounds natural, realistic and human-like. Therefore, the system used for collecting the training data for training these models addresses how to collect speech training data that conveys a range of different emotions/expressions.

The actor's terminal 105 then sends the newly collected targeted speech data back to the server 111. The server then uses this to train and improve the acoustic model.

Speech and text received from the actor's terminal 105 is provided to processor 121 in server 111. The processor is adapted to train an acoustic model, 123, 125, 127. In this embodiment, there are three models which are trained. For example, one might be for neutral speech (e.g. Model A 123), one for angry speech (Model B 125) and one for upset speech (Model C 127).

However, in other embodiments, the models may be models trained with differing amounts of training data, for example, trained after 6 hours of data, 9 hours of data and 12 hours of data. Although, the training of multiple models are shown above, a single model could also be trained.

At run-time, the acoustic model 123, 125, 127 will be provided with a text input and will be able to output speech in response to that text input. In an embodiment, the acoustic model can be used to output quite emotional speech. The acoustic model can be controlled to output speech with a particular emotion. For example, the phrase "have you seen what he did?" could be expressed as an innocent question or could be expressed in anger. In an embodiment, the user can select the emotion level for the output speech, for example the user can specify 'speech patterns' along with the text input. This may be continuous or discrete. e.g. 'have you seen what he did?'+'anger' or 'have you seen what he did?'+7.5/10 anger.

Once a model has been trained, it is passed into processor 129 for evaluation. It should be noted that in FIG. 2, processor 129 is shown as a separate processor. However, in practice, both the training and the testing can be performed using the same processor.

Figure 2:
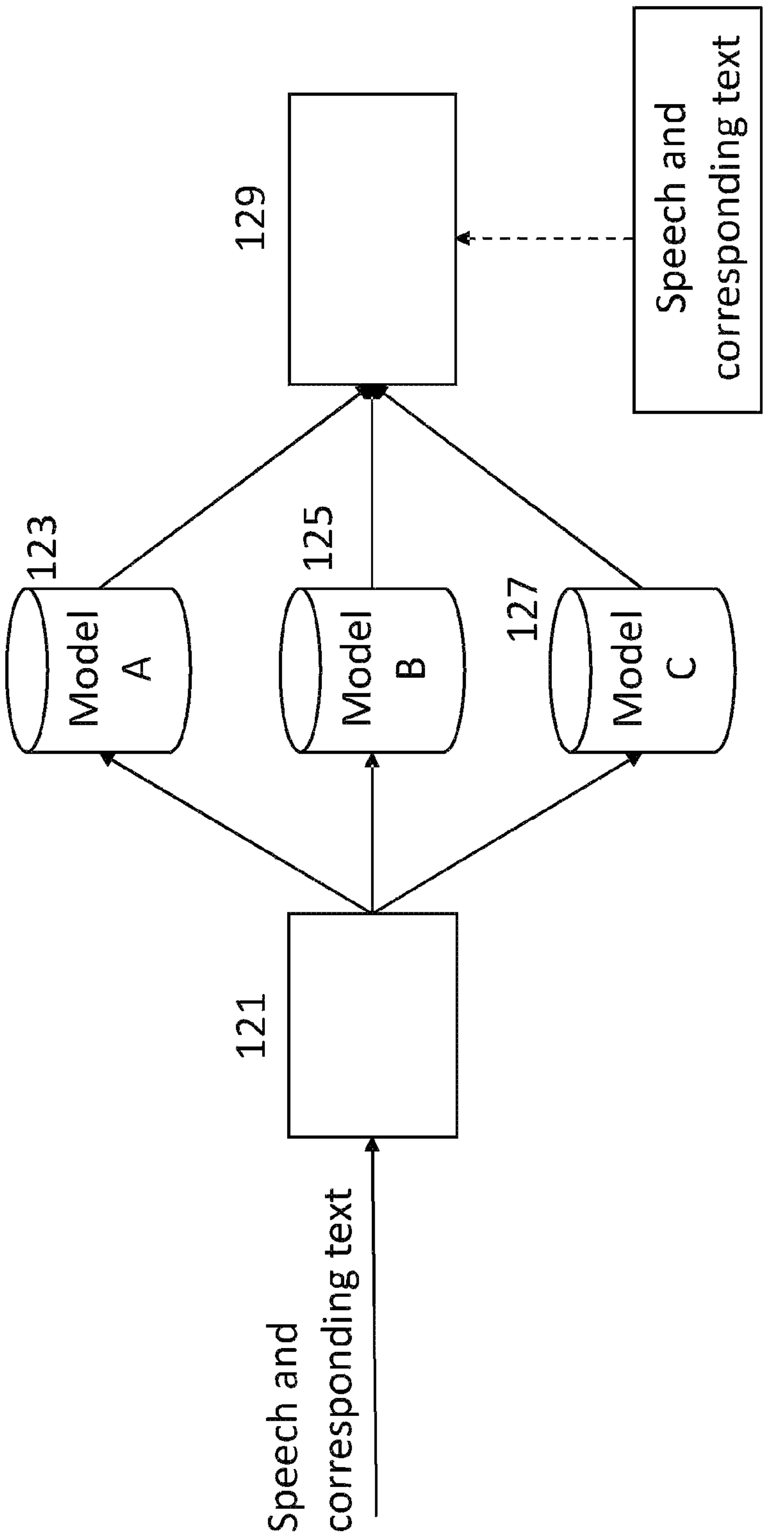
FIG. 2 is an diagram showing an overview of the server side of the system of FIG. 1.

The testing will be described in detail with reference to FIG. 3 and also FIGS. 7 to 11. In FIG. 2, as will be described later, in some embodiments, the validity of the model is tested using test sentences. These may be some of the test sentences used to initially train the model or maybe different sentences with audio collected the same time as the data used to train the model. In other embodiments, the intermediate outputs themselves are evaluated for quality.

If the quality of the model is not acceptable, a targeted request for more data will be sent to the actor. By targeted, this means that the model identifies exactly the nature data required to improve its performance.

Figure 3:
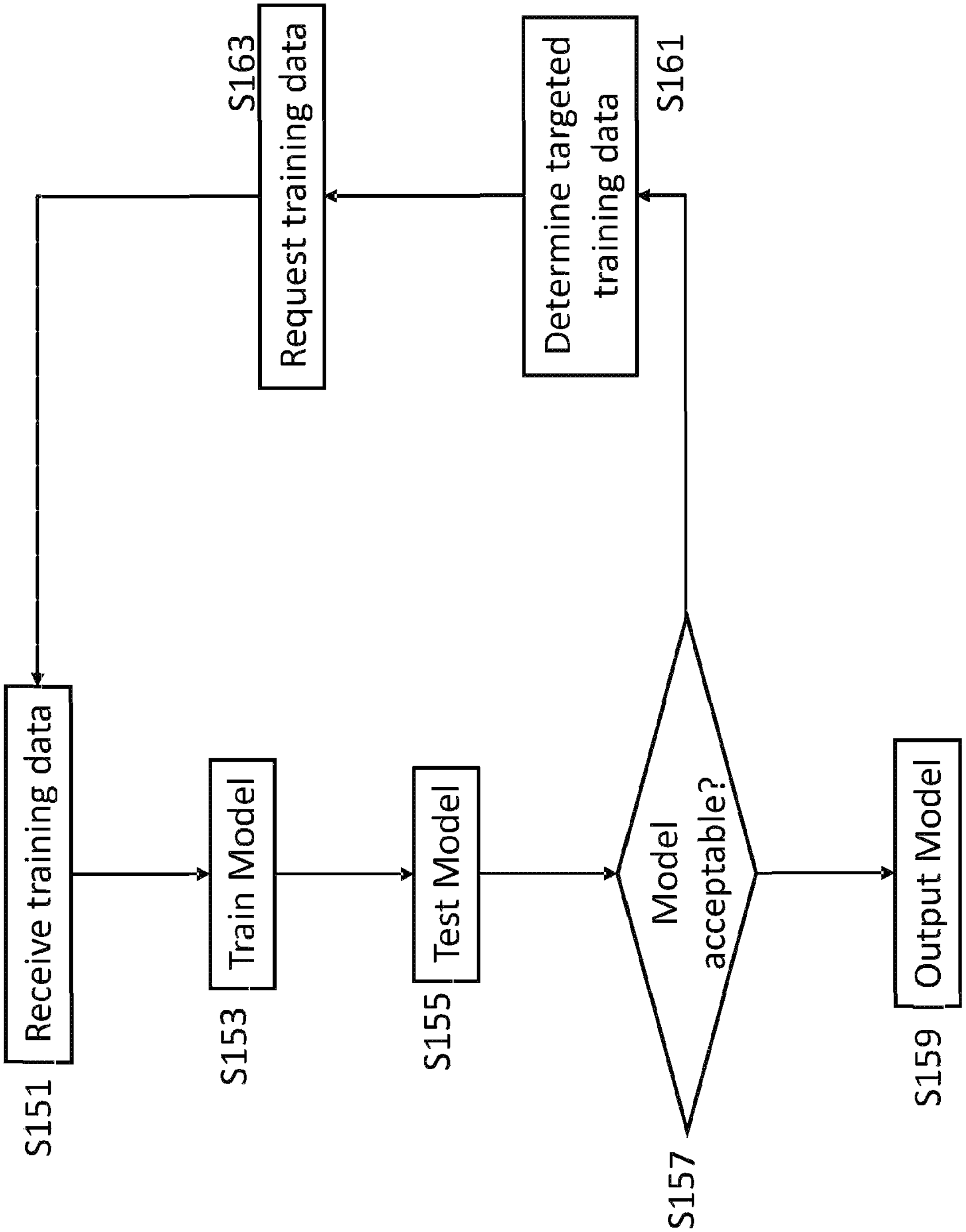
FIG. 3 is a flow chart depicting a method performed at a server in accordance with an embodiment.

FIG. 3 is a flowchart showing the basic steps. In step S151, the training data which will comprise audio and the corresponding sentences from the actor as described with reference to FIG. 1. Next, the model or models will be trained in accordance with step S153. How this happens will be described in more detail with reference to FIGS. 4 to 6(*c*).

In step S155, the model is then tested. How this is exactly achieved will be described with reference to FIGS. 7 to 11 below. In step S157, the test is then made to see if the model is acceptable. This test might take many different forms. For example, a test sentence may be provided to the system. In other examples, the intermediate outputs themselves are examined. Where intermediate outputs are used, in an embodiment, a test is provided using suitable input parameters e.g. text line or text line and speech pattern, then the intermediate outputs are analysed to see if that test sentence is being synthesised well.

The step of determining whether the model is acceptable is performed over a plurality of sentences, for example 10,000. In an embodiment, a total score is given for the plurality of sentences.

If the model is determined to be acceptable in step S157, then the model is deemed ready for use in step S159. However, if the model is not determined as acceptable in step S157, training data will be identified in step S161 that will help the model improve. It should be noted, that this training data would be quite targeted to address the specific current failings of the model.

It should be noted that the above steps of testing the model, determining the models acceptability and determining the targeted training data are all performed automatically by processor 129. The training data is then requested from the actor in step S163. Again, this is done entirely unsupervised and automatically.

Before an explanation of how the testing of a model and sending of a targeted request for further data is performed, a discussion of a speech synthesis system in accordance with an embodiment will be described.

Figure 4:
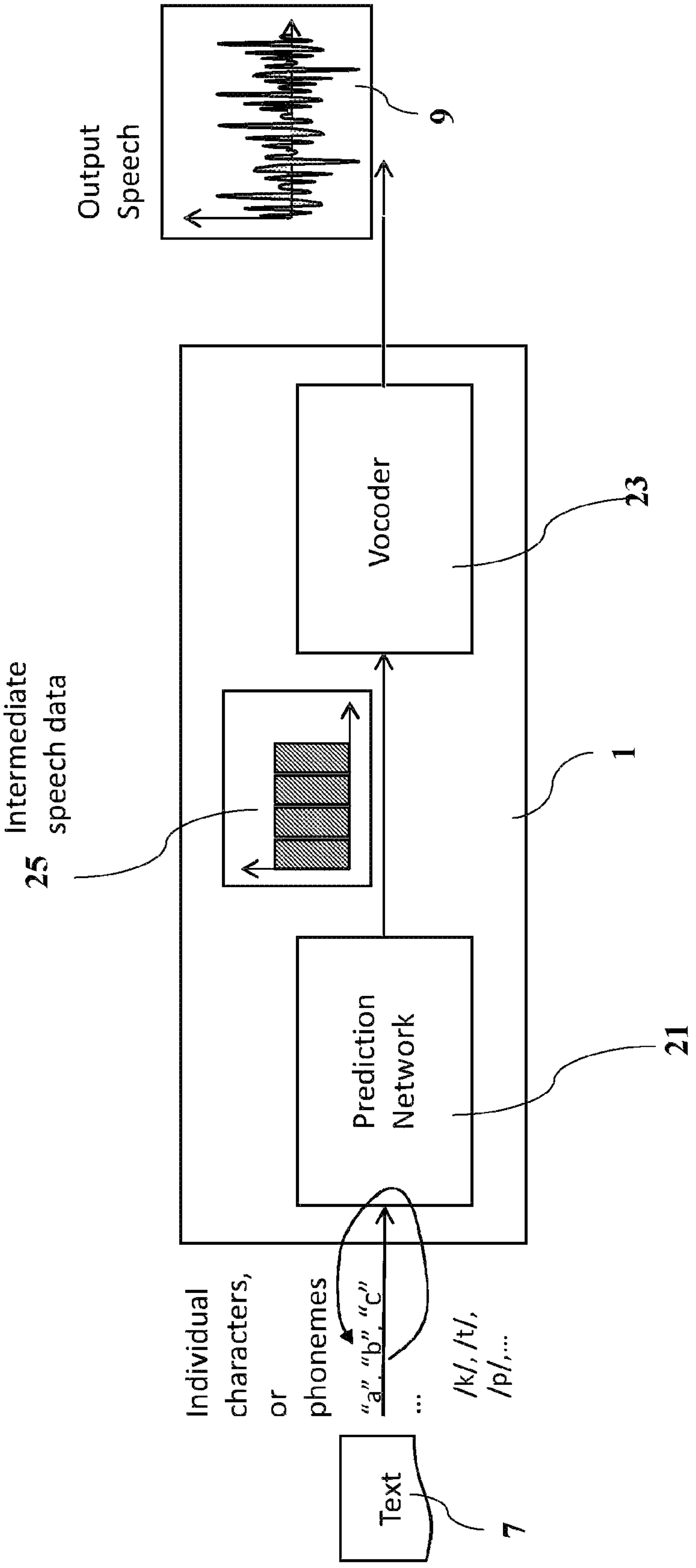
FIG. 4 shows a schematic illustration of a text-to-speech (TTS) synthesis system for generating speech from text in accordance with an embodiment.

FIG. 4 shows a schematic illustration of a system 1 for generating speech 9 from text 7.

The system comprises a prediction network 21 configured to convert input text 7 into a speech data 25. The speech data 25 is also referred to as the intermediate speech data 25. The system further comprises a Vocoder that converts the intermediate speech data 25 into an output speech 9. The prediction network 21 comprises a neural network (NN). The Vocoder also comprises a NN.

The prediction network 21 receives a text input 7 and is configured to convert the text input 7 into an intermediate speech data 25. The intermediate speech data 25 comprises information from which an audio waveform may be derived. The intermediate speech data 25 may be highly compressed while retaining sufficient information to convey vocal expressiveness. The generation of the intermediate speech data 25 will be described further below in relation to FIG. 5.

The text input 7 may be in the form of a text file or any other suitable text form such as ASCII text string. The text may be in the form of single sentences or longer samples of text. A text front-end, which is not shown, converts the text sample into a sequence of individual characters (e.g. "a", "b", "c" . . . ). In another example, the text front-end converts the text sample into a sequence of phonemes (/k/, /t/, /p/, . . . ).

The intermediate speech data 25 comprises data encoded in a form from which a speech sound waveform can be obtained. For example, the intermediate speech data may be a frequency domain representation of the synthesised speech. In a further example, the intermediate speech data is a spectrogram. A spectrogram may encode a magnitude of a complex number as a function of frequency and time. In a further example, the intermediate speech data 25 may be a mel spectrogram. A mel spectrogram is related to a speech sound waveform in the following manner: a short-time Fourier transform (STFT) is computed over a finite frame size, where the frame size may be 50 ms, and a suitable window function (e.g. a Hann window) may be used; and the magnitude of the STFT is converted to a mel scale by applying a non-linear transform to the frequency axis of the STFT, where the non-linear transform is, for example, a logarithmic function.

The Vocoder module takes the intermediate speech data 25 as input and is configured to convert the intermediate speech data 25 into a speech output 9. The speech output 9 is an audio file of synthesised expressive speech and/or information that enables generation of expressive speech. The Vocoder module will be described further below.

In another example, which is not shown, the intermediate speech data 25 may be in a form from which an output speech 9 can be directly obtained. In such a system, the Vocoder 23 is optional.

Figure 5:
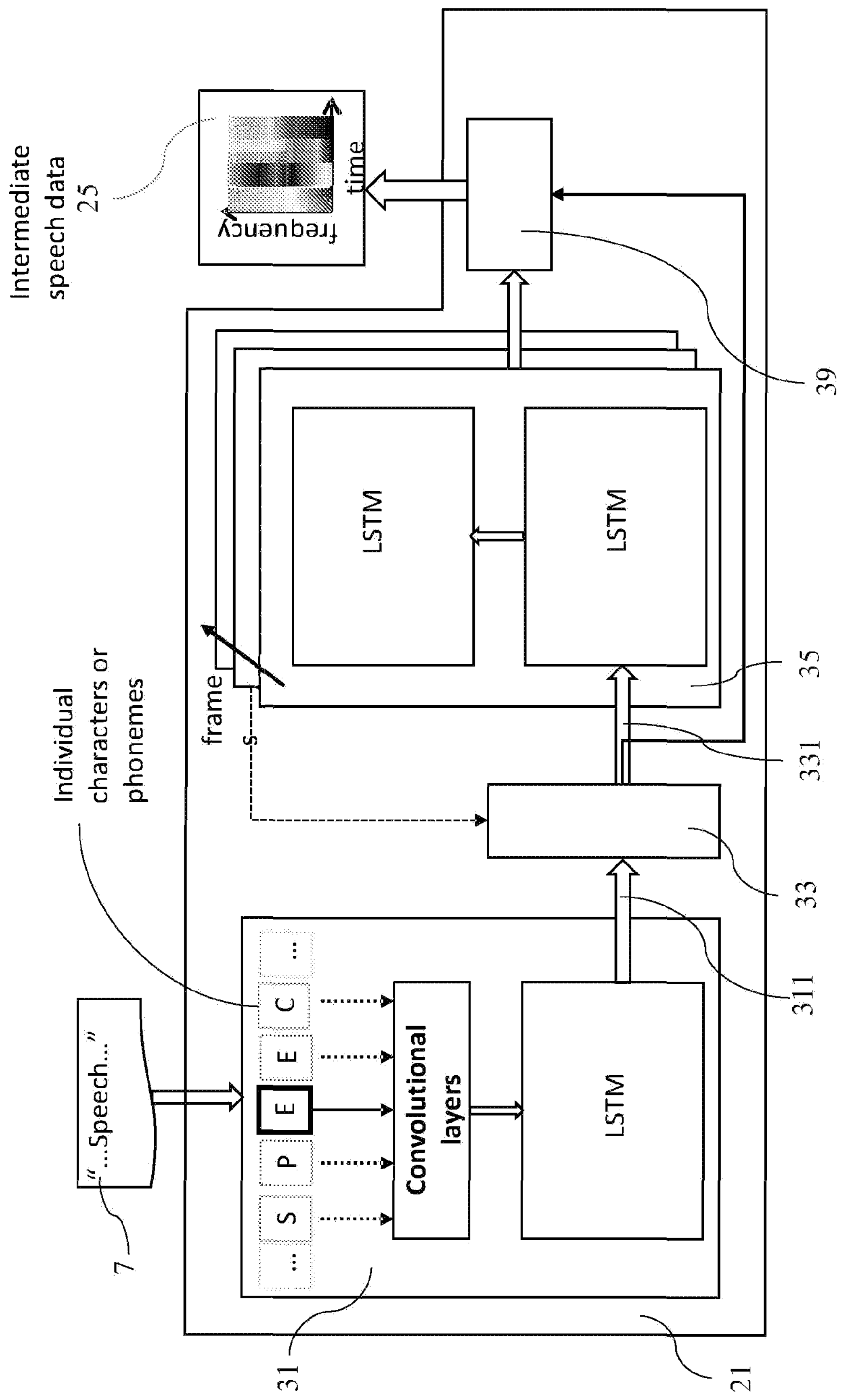
FIG. 5 shows a schematic illustration of a prediction network that converts textual information into intermediate speech data in accordance with an embodiment.

FIG. 5 shows a schematic illustration of the prediction network 21 according to a non-limiting example. It will be understood that other types of prediction networks that comprise neural networks (NN) could also be used.

The prediction network 21 comprises an Encoder 31, an attention network 33, and decoder 35. As shown in FIG. 2, the prediction network maps a sequence of characters to intermediate speech data 25. In an alternative example which is not shown, the prediction network maps a sequence of phonemes to intermediate speech data 25. In an example, the prediction network is a sequence to sequence model. A sequence to sequence model maps a fixed length input from one domain to a fixed length output in a different domain, where the length of the input and output may differ.

The Encoder 31 takes as input the text input 7. The encoder 31 comprises a character embedding module (not shown) which is configured to convert the text input 7, which may be in the form words, sentences, paragraphs, or other forms, into a sequence of characters. Alternatively, the encoder may convert the text input into a sequence of phonemes. Each character from the sequence of characters may be represented by a learned 512-dimensional character embedding. Characters from the sequence of characters are passed through a number of convolutional layers. The number of convolutional layers may be equal to three for example. The convolutional layers model longer term context in the character input sequence. The convolutional layers each contain 512 filters and each filter has a 5×1 shape so that each filer spans 5 characters. To the outputs of each of the three convolution layers, a batch normalisation step (not shown) and a ReLU activation function (not shown) are applied. The encoder 31 is configured to convert the sequence of characters (or alternatively phonemes) into encoded features 311 which is then further processed by the attention network 33 and the decoder 35.

The output of the convolutional layers is passed to a recurrent neural network (RNN). The RNN may be a long-short term memory (LSTM) neural network (NN). Other types of RNN may also be used. According to one example, the RNN may be a single bi-directional LSTM containing 512 units (256 in each direction). The RNN is configured to generate encoded features 311. The encoded features 311 output by the RNN may be a vector with a dimension k.

The Attention Network 33 is configured to summarize the full encoded features 311 output by the RNN and output a fixed-length context vector 331. The fixed-length context vector 331 is used by the decoder 35 for each decoding step. The attention network 33 may take information (such as weights) from previous decoding steps (that is, from previous speech frames decoded by decoder) in order to output a fixed-length context vector 331. The function of the attention network 33 may be understood to act as a mask that focusses on the important features of the encoded features 311 output by the encoder 31. This allows the decoder 35, to focus on different parts of the encoded features 311 output by the encoder 31 on every step. The output of the attention network 33, the fixed-length context vector 331, may have dimension m, where m may be less than k. According to a further example, the Attention network 33 is a location-based attention network.

According to one embodiment, the attention network 33 takes as input an encoded feature vector 311 denoted as h={h1, h2, . . . , hk}. A(i) is a vector of attention weights (called alignment). The vector A(i) is generated from a function attend(s(i−1), A(i−1), h), where s(i−1) is a previous decoding state and A(i−1) is a previous alignment. s(i−1) is 0 for the first iteration of first step. The attend( ) function is implemented by scoring each element in h separately and normalising the score. G(i) is the context vector and is computed from $G(i)=\Sigma_k A(i,k)\times h_k$. The output of the attention network 33 is generated as Y(i)=generate(s(i−1), G(i)), where generate( ) may be implemented using a recurrent layer of 256 gated recurrent units (GRU) units for example. The attention network 33 also computes a new state s(i) =recurrency(s(i−1), G(i), Y(i)), where recurrency( ) is implemented using LSTM.

In this embodiment, the decoder 35 is an autoregressive RNN which decodes information one frame at a time. The information directed to the decoder 35 is be the fixed length context vector 331 from the attention network 33. In another example, the information directed to the decoder 35 is the fixed length context vector 331 from the attention network 33 concatenated with a prediction of the decoder 35 from the previous step. In each decoding step, that is, for each frame being decoded, the decoder may use the results from previous frames as an input to decode the current frame. In an example, as shown in FIG. 2, the decoder autoregressive RNN comprises two uni-directional LSTM layers with 1024 units. The prediction from the previous time step is first passed through a small pre-net (not shown) containing 2 fully connected layers of 256 hidden ReLU units. The output of the pre-net, and the attention context vector are concatenated and then passed through the two uni-directional LSTM layers. The output of the LSTM layers is directed to a predictor 39 where it is concatenated with the fixed-length context vector 331 from the attention network 33 and projected through a linear transform to predict a target mel spectrogram. The predicted mel spectrogram is further passed through a 5-layer convolutional post-net which predicts a residual to add to the prediction to improve the overall reconstruction. Each post-net layer is comprised of 512 filters with shape 5×1 with batch normalization, followed by tanh activations on all but the final layer. The output of the predictor 39 is the speech data 25.

The parameters of the encoder 31, decoder 35, predictor 39 and the attention weights of the attention network 33 are the trainable parameters of the prediction network 21.

According to another example, the prediction network 21 comprises an architecture according to Shen et al. "Natural TTS synthesis by conditioning wavenet on mel spectrogram predictions." 2018 IEEE International Conference on Acoustics, Speech and Signal Processing (ICASSP), IEEE, 2018.

Returning to FIG. 4, the Vocoder 23 is configured to take the intermediate speech data 25 from the prediction network 21 as input, and generate an output speech 9. In an example, the output of the prediction network 21, the intermediate speech data 25, is a mel spectrogram representing a prediction of the speech waveform.

According to an embodiment, the Vocoder 23 comprises a convolutional neural network (CNN). The input to the Vocoder 23 is a frame of the mel spectrogram provided by the prediction network 21 as described above in relation to FIG. 4. The mel spectrogram 25 may be input directly into the Vocoder 23 where it is inputted into the CNN. The CNN of the Vocoder 23 is configured to provide a prediction of an output speech audio waveform 9. The predicted output speech audio waveform 9 is conditioned on previous samples of the mel spectrogram 25. The output speech audio waveform may have 16-bit resolution. The output speech audio waveform may have a sampling frequency of 24 kHz.

According to an alternative example, the Vocoder 23 comprises a convolutional neural network (CNN). The input to the Vocoder 23 is derived from a frame of the mel spectrogram provided by the prediction network 21 as described above in relation to FIG. 5. The mel spectrogram 25 is converted to an intermediate speech audio waveform by performing an inverse STFT. Each sample of the speech audio waveform is directed into the Vocoder 23 where it is inputted into the CNN. The CNN of the Vocoder 23 is configured to provide a prediction of an output speech audio waveform 9. The predicted output speech audio waveform 9 is conditioned on previous samples of the intermediate speech audio waveform. The output speech audio waveform may have 16-bit resolution. The output speech audio waveform may have a sampling frequency of 24 kHz.

According to another example, the Vocoder 23 comprises a WaveNet NN architecture such as that described in Shen et al. "Natural tts synthesis by conditioning wavenet on mel spectrogram predictions." 2018 IEEE International Conference on Acoustics, Speech and Signal Processing (ICASSP). IEEE, 2018.

According to a further example, the Vocoder 23 comprises a WaveGlow NN architecture such as that described in Prenger et al. "Waveglow: A flow-based generative network for speech synthesis." ICASSP 2019-2019 IEEE International Conference on Acoustics, Speech and Signal Processing (ICASSP). IEEE, 2019.

According to an alternative example, the Vocoder 23 comprises any deep learning based speech model that converts an intermediate speech data 25 into output speech 9.

According to another alternative embodiment, the Vocoder 23 is optional. Instead of a Vocoder, the prediction network 21 of the system 1 further comprises a conversion module (not shown) that converts intermediate speech data 25 into output speech 9. The conversion module may use an algorithm rather than relying on a trained neural network. In an example, the Griffin-Lim algorithm is used. The Griffin-Lim algorithm takes the entire (magnitude) spectrogram from the intermediate speech data 25, adds a randomly initialised phase to form a complex spectrogram, and iteratively estimates the missing phase information by: repeatedly converting the complex spectrogram to a time domain signal, converting the time domain signal back to frequency domain using STFT to obtain both magnitude and phase, and updating the complex spectrogram by using the original magnitude values and the most recent calculated phase values. The last updated complex spectrogram is converted to a time domain signal using inverse STFT to provide output speech 9.

Figure 6A:
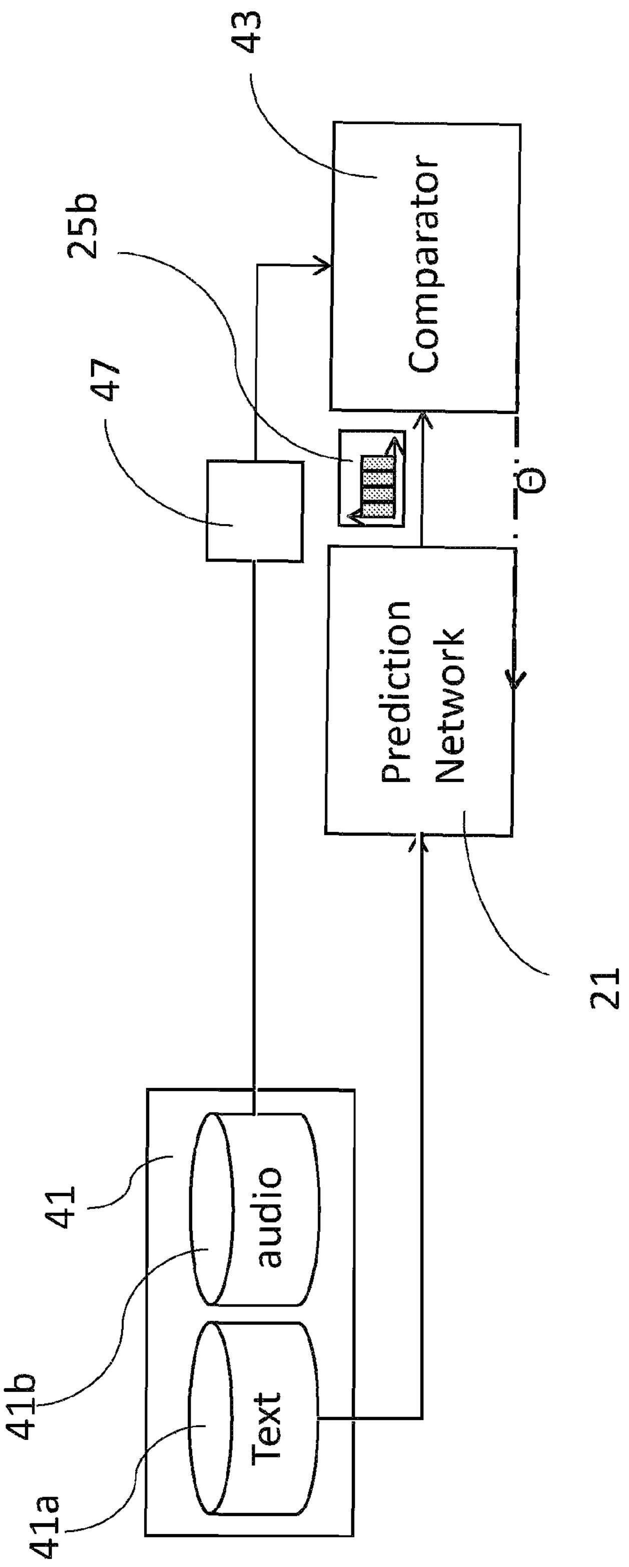
FIG. 6(*a*) shows a schematic illustration of the training of the prediction network of FIG. 5 in accordance with an embodiment.
Figure 6B:
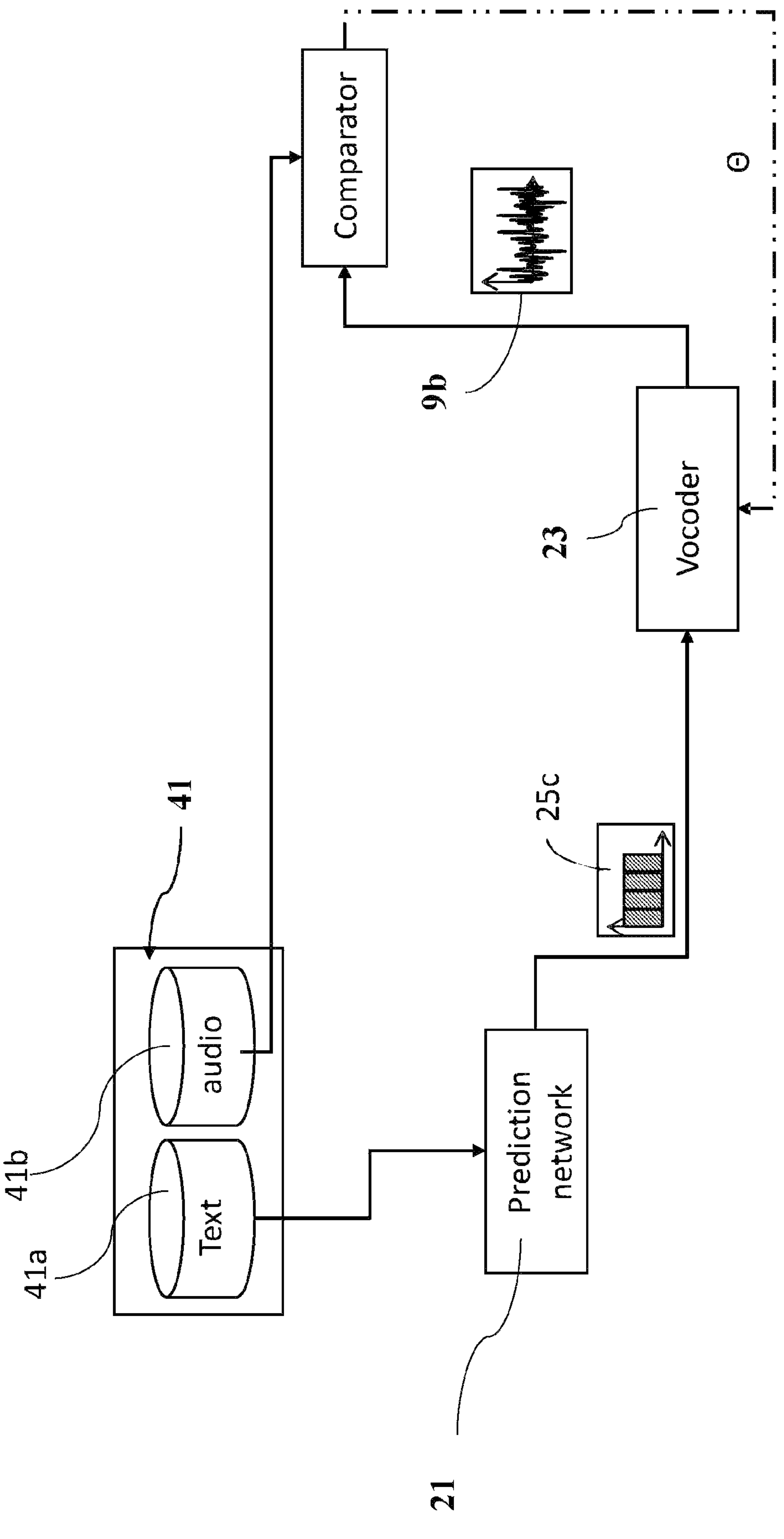
Figure 6C:
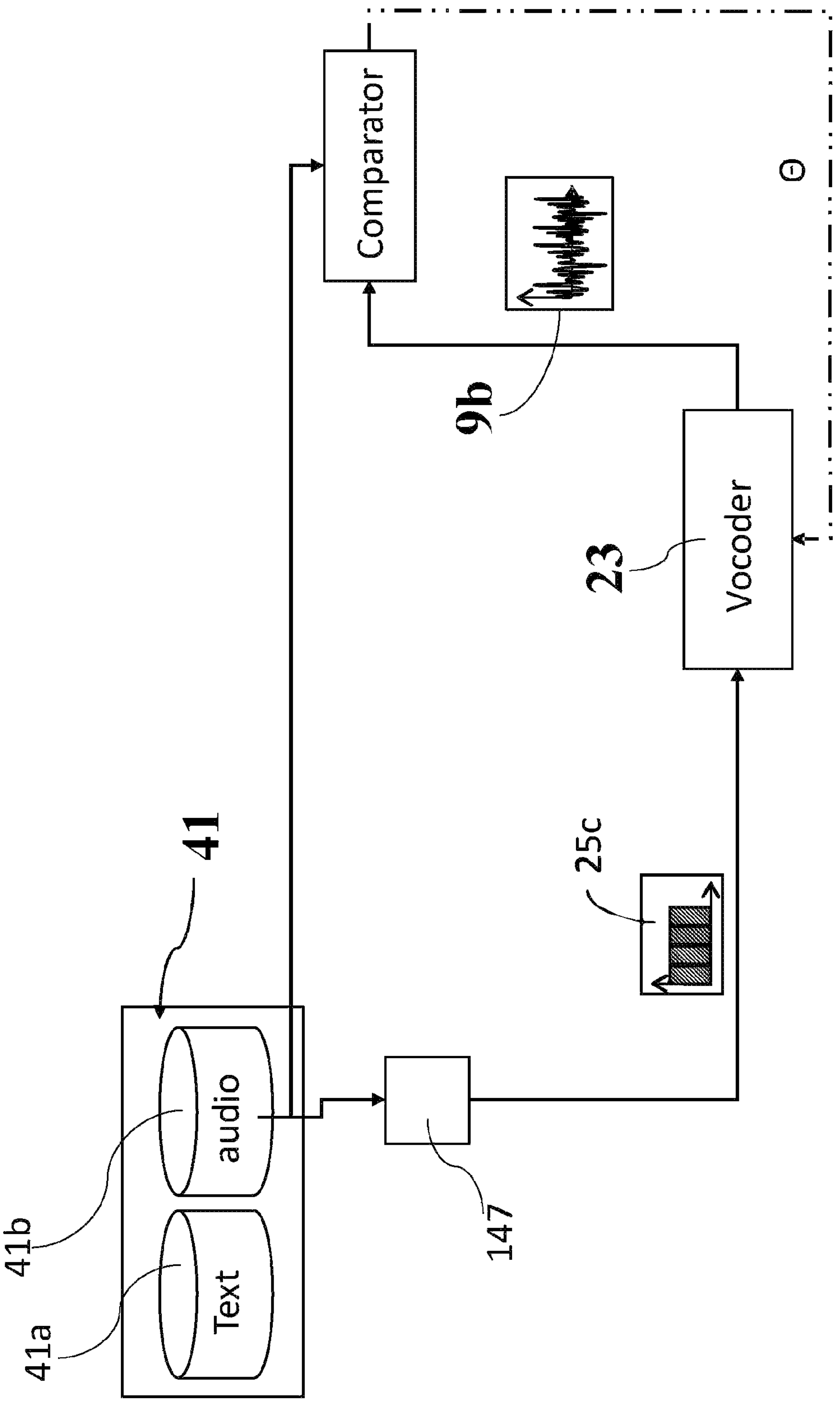

FIG. 6(*a*) shows a schematic illustration of a configuration for training the prediction network 21 according to an example. The prediction network 21 is trained independently of the Vocoder 23. According to an example, the prediction network 21 is trained first and the Vocoder 23 is then trained independently on the outputs generated by the prediction network 21.

According to an example, the prediction network 21 is trained from a first training dataset 41 of text data 41*a* and audio data 41*b* pairs as shown in FIG. 6(*a*). The Audio data 41*b* comprises one or more audio samples. In this example, the training dataset 41 comprises audio samples from a single speaker. In an alternative example, the training set 41 comprises audio samples from different speakers. When the audio samples are from different speakers, the prediction network 21 comprises a speaker ID input (e.g. an integer or learned embedding), where the speaker ID inputs correspond to the audio samples from the different speakers. In the figure, solid lines (–) represent data from a training sample, and dash-dot-dot-dash (-••-) lines represent the update of the weights Θ of the neural network of the prediction network 21 after every training sample. Training text 41*a* is fed in to the prediction network 21 and a prediction of the intermediate speech data 25*b* is obtained. The corresponding audio data 41*b* is converted using a converter 47 into a form where it can be compared with the prediction of the intermediate speech data 25*b* in the comparator 43. For example, when the intermediate speech data 25*b* is a mel spectrogram, the converter 47 performs a STFT and a non-linear transform that converts the audio waveform into a mel spectrogram. The comparator 43 compares the predicted first speech data 25*b* and the converted audio data 41*b*. According to an example, the comparator 43 may compute a loss metric such as a cross entropy loss given by: —(actual converted audio data) log (predicted first speech data). Alternatively, the comparator 43 may compute a loss metric such as a mean squared error. The gradients of the error with respect to the weights Θ of the prediction network may be found using a back propagation through time algorithm. An optimiser function such as a gradient descent algorithm may then be used to learn revised weights Θ. Revised weights are then used to update (represented by -••- in FIGS. 6(*a*) and (*b*)) the NN model in the prediction network 21.

The training of the Vocoder 23 according to an embodiment is illustrated in FIG. 6(*b*) and is described next. The Vocoder is trained from a training set of text and audio pairs 40 as shown in FIG. 6(*b*). In the figure, solid lines (–) represent data from a training sample, and dash-dot-dot-dash (-••-) lines represent the update of the weights of the neural network. Training text 41*a* is fed in to the trained prediction network 21 which has been trained as described in relation to FIG. 6(*a*). The trained prediction network 21 is configured in teacher-forcing mode—where the decoder 35 of the prediction network 21 is configured to receive a conversion of the actual training audio data 41*b* corresponding to a previous step, rather than the prediction of the intermediate speech data from the previous step—and is used to generate a teacher forced (TF) prediction of the first speech data 25*c*. The TF prediction of the intermediate speech data 25*c* is then provided as a training input to the Vocoder 23. The NN of the vocoder 23 is then trained by comparing the predicted output speech 9*b* with the actual audio data 41*b* to generate an error metric. According to an example, the error may be the cross entropy loss given by:—(actual converted audio data 41*b*) log (predicted output speech 9*b*). The gradients of the error with respect to the weights of the CNN of the Vocoder 23 may be found using a back propagation algorithm. A gradient descent algorithm may then be used to learn revised weights. Revised weights Θ are then used to update (represented by -••- in FIG. 6(*b*)) the NN model in the vocoder.

The training of the Vocoder 23 according to another embodiment is illustrated in FIG. 6(*c*) and is described next. The training is similar to the method described for FIG. 6(*b*) except that training text 41*a* is not required for training. Training audio data 41*b* is converted into first speech data 25*c* using converter 147. Converter 147 performs the same operation implemented by converter 47 described in relation to FIG. 6(*a*). Thus, converter 147 converts the audio waveform into a mel spectrogram. The intermediate speech data 25*c* is then provided as a training input to the Vocoder 23 and the remainder of the training steps are described in relation to FIG. 6(*b*).

Next follows an explanation of three possible methods for the automated testing of models and requesting of further data.

The first method, the transcription metric, is designed to measure the intelligibility of the model. A large dataset of test sentences are prepared and inputted into the trained model that is being tested, these sentences are then synthesised into their corresponding speech using the trained model.

The resulting audio/speech outputs of the model for these sentences are then passed through a speech-to-text (STT) system. The text resulting from this inference is then converted into its representative series of phonemes, with punctuation removed. The outputted series of phonemes is compared, on a sentence-by-sentence basis, to the series of phonemes representing the original input text. If this series of phonemes exactly matches the series of phonemes represented by the original input text, then that specific sentence is assigned a perfect score of 0.0. In this embodiment, the "distance" between the input phoneme string and the output phoneme string is measured using the Levenshtein distance; the Levenshtein distance corresponds to the total number of single character edits (insertions, deletions or substitutions) that are required to convert one string to the other. Alternative methods of measuring the differences and hence "distance" between the input and output phoneme string can be used.

STT systems are not perfect; in order to ensure the errors being measured by the transcription metric are produced by the model being tested and not the STT system itself, in an embodiment multiple STT systems of differing quality are used. Sentences with high transcription errors for all STT systems are more likely to contain genuine intelligibility errors caused by the TTS model than those for which only some STT systems give high transcription errors.

Figure 7:
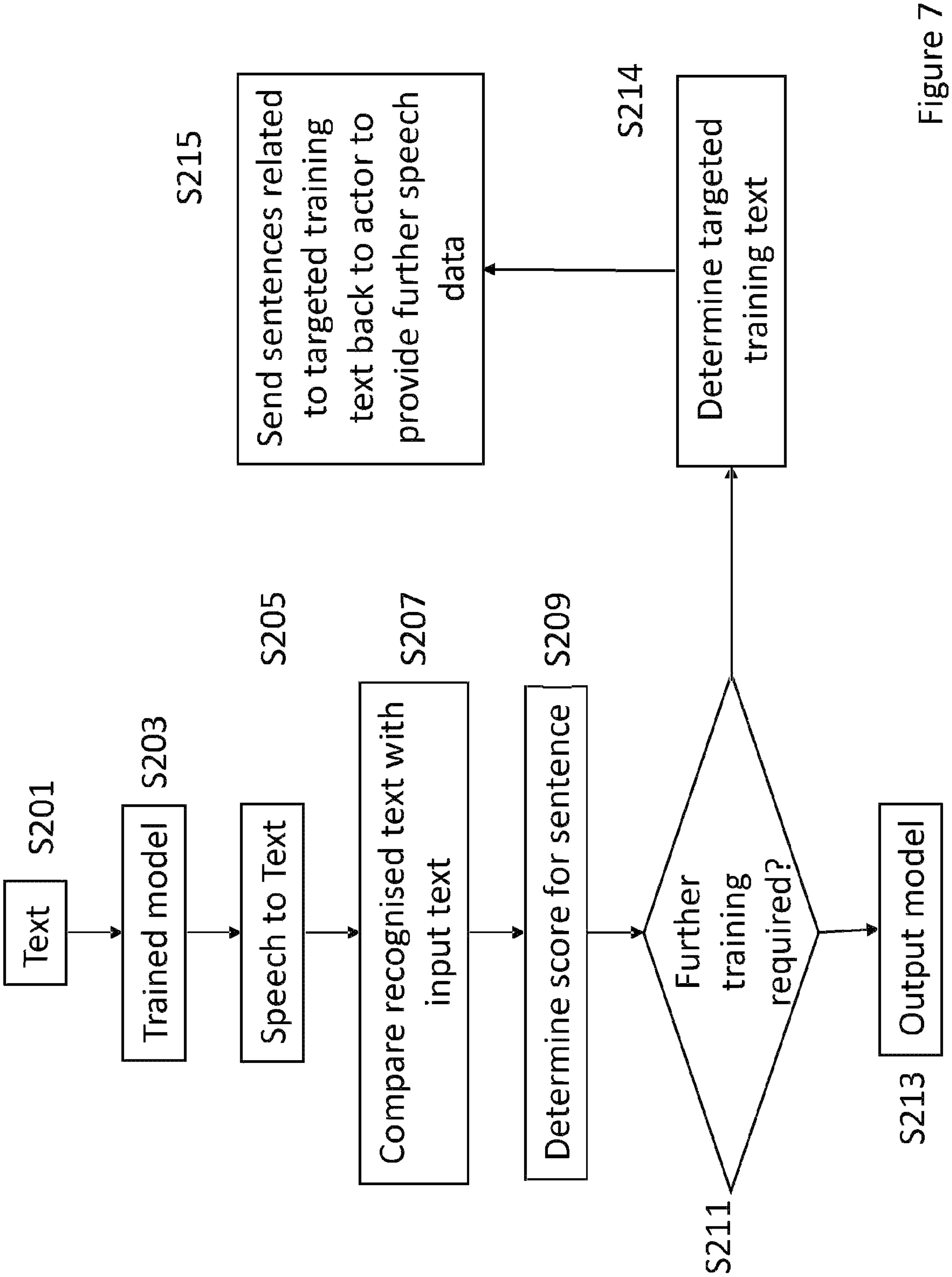
FIG. 7 is a flow chart depicting a method of testing the speech synthesis model and sending targeted training sentences back to the actor in accordance with an embodiment.

A flowchart delineating the steps involved in computing the transcription metric is detailed in FIG. 7. The first method receives text in step S201. The sentence is input into the trained model step S203. The trained model produces an audio output as explained above. This audio output is then provided through recognition speech to text (STT) model in step S205.

In an embodiment, the STT model is just an acoustic model that converts speech signals into acoustic units in the absence of a language model. In another embodiment, the STT model is coupled with a language model.

In a yet further embodiment, multiple STT models are used and the result is averaged. The output series of phonemes from the STT in step S205 is then compared with the input series of phonemes S201 in step S207. This comparison can be a direct comparison of the acoustic units or phonemes derived from the input text compared with the output of the STT. From this, judgement can be made as to whether the STT is output an accurate reflection of the input text in step S201. If the input series of phonemes exactly matches the output series of phonemes, then it receives a perfect score of 0.0. The distance between the two series of phonemes is the Levenshtein distance as described earlier.

This Levenshtein distance/score is calculated on a sentence-by-sentence basis in step S209, meaning that a total score for a large dataset of sentences is calculated by averaging the transcription metric score for all of the sentences in the dataset.

In step S211, it is then determined if it is necessary to obtain further training data for the model. This can be done in a number of ways, for example, on receipt of one poor sentence from S209, by reviewing the average score for a plurality of sentences or by combining this metric determined from STT with other metrics that will be described later.

In an embodiment, the average score for all sentences is calculated. If this is below a threshold (for example, a value of 1 for Levenshtein distance), then it is determined that no further training is required. As noted above, in an embodiment that will be described later, multiple metrics will be determined for each sentence and these will be compared as will be described later.

In step S214, targeted training text is determined from the sentences that have had poor scores in S209.

At step S215, the system then requests further audio data from the actor. However, instead of sending the actor random further sentences to read, the system is configured to send targeted sentences which are targeted to address the specific problems with the acoustic model.

In one simple embodiment, the actor could be sent to the sentences that were judged to be bad by the system. However, in other methods further sentences are generated for the actor to speak which are similar to the sentences that gave poor results.

The above example has suggested a transcription metric as a metric for determining whether the model is acceptable or not. However, this is only one example. In other examples, a measure of the "human-ness" or the expressivity in the output speech could be used.

Figure 8:
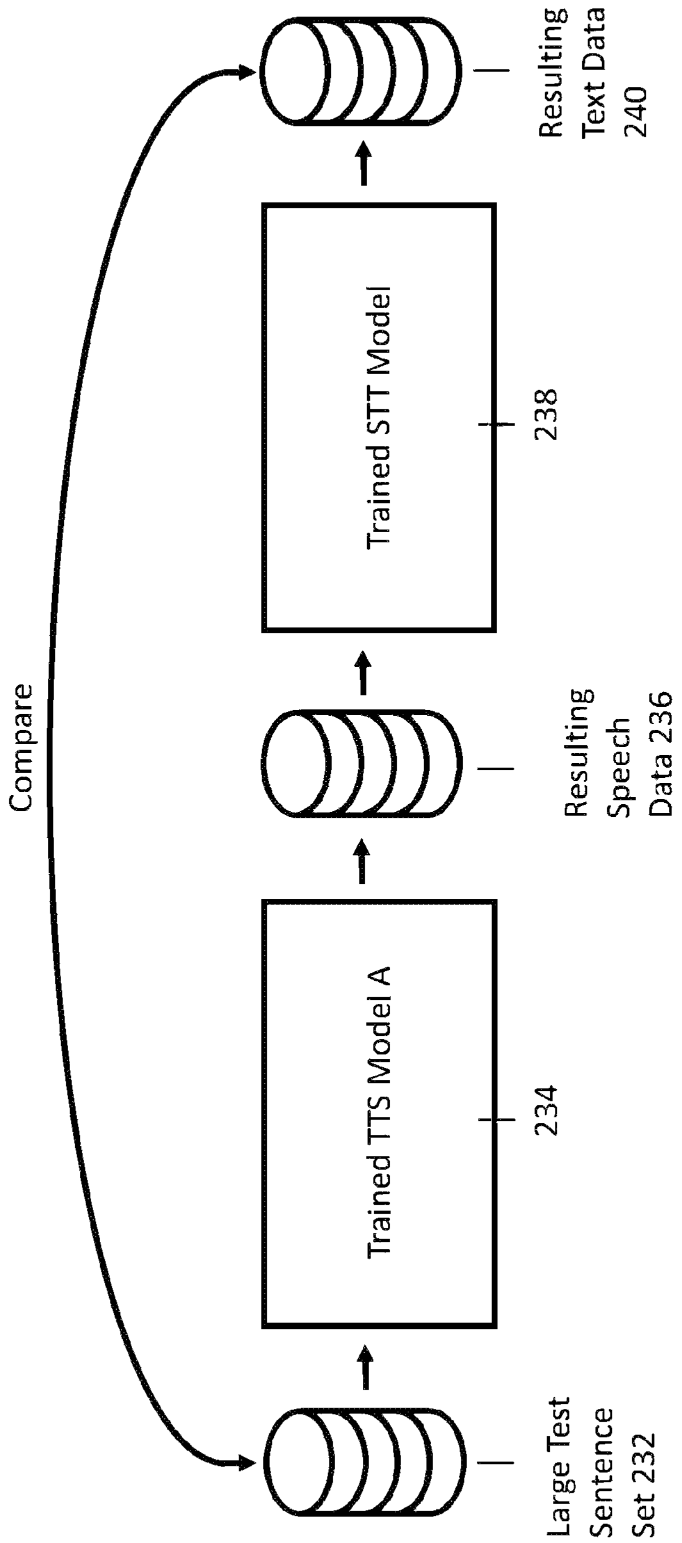
FIG. 8 is a diagram illustrating the testing described in relation to FIG. 7.

FIG. 8 shows schematically the first few steps of FIG. 7. Here, the large test sentence set 232 is seen being input into trained TTS model 234. This outputs result in speech data 236. This is then put through a trained speech to text model 238 which outputs text data 240. The text data set 240 and the input test sentence 232 are compared.

The method of FIGS. 7 and 8 uses an intermediate output to determine whether the model is acceptable and to select the sentences to the actor to provide further data.

A further metric that can be used is attention scoring. Here, the automatic testing of models and requesting of further data uses the model property of the attention weights of the attention mechanism.

From the attention weights, an attention metric/score can be calculated and used as an indication of the quality of the performance of the attention mechanism and thus model quality. The attention weights is a matrix of coefficients that indicate the strength of the links between the input and output tokens, alternatively this can be thought of as representing the influence that the input tokens have over the output tokens. In an embodiment, the input tokens/states are a sequence of linguistic units (such as characters or phonemes) and the output tokens/states are a sequence of acoustic units, specifically mel spectrogram frames, that are concatenated together to form the generated speech audio.

The attention mechanism was referred to in FIG. 5. In an embodiment, the input tokens/states are the result of the output of the encoder 31, a non-linear function that can be, but is not limited to, a recurrent neural network and takes the text sentence as input. The output tokens/states are the result of the decoder 35, which again can be a recurrent neural network, and uses the alignment shown by the attention weights to decide which portions of the input states to focus on to produce a given output spectrogram frame.

Figure 9:
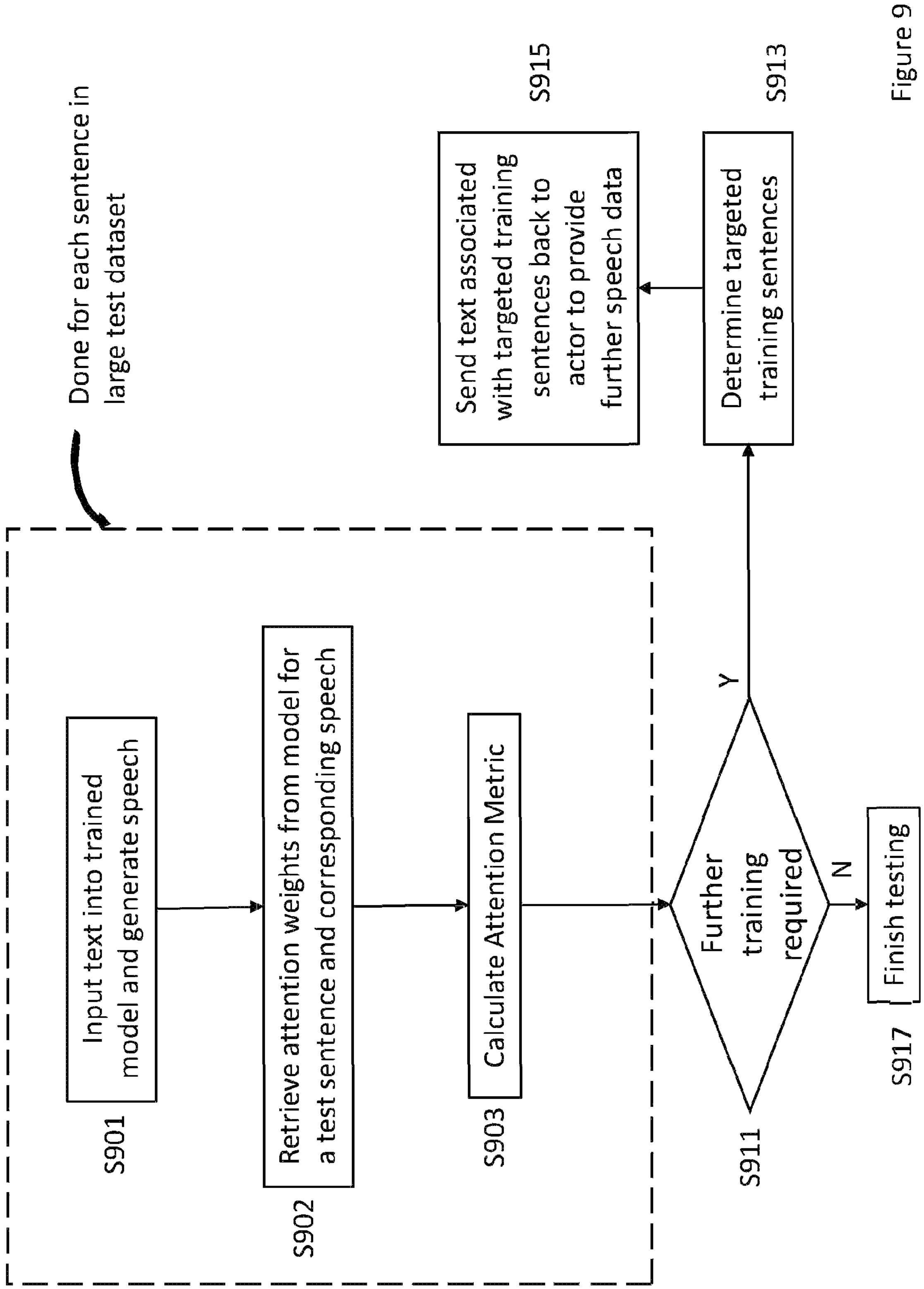
FIG. 9 a flow chart depicting a method of testing the speech synthesis model and sending targeted training sentences back to the actor in accordance with a further embodiment.
Figure 10A:
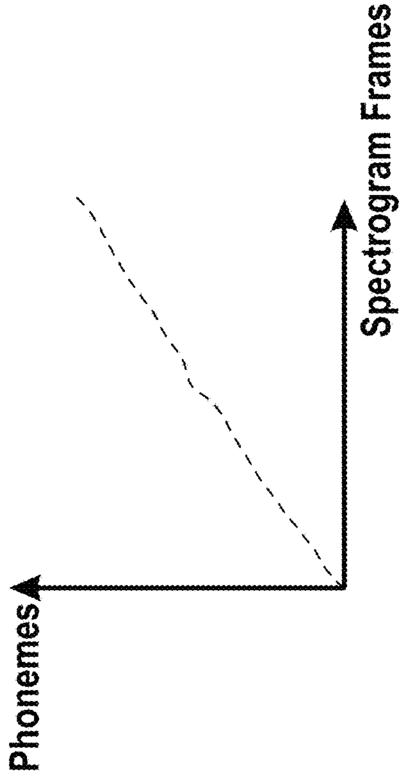
FIGS. 10(*a*) to 10(*d*) are plots demonstrating attention alignment.
Figure 10B:
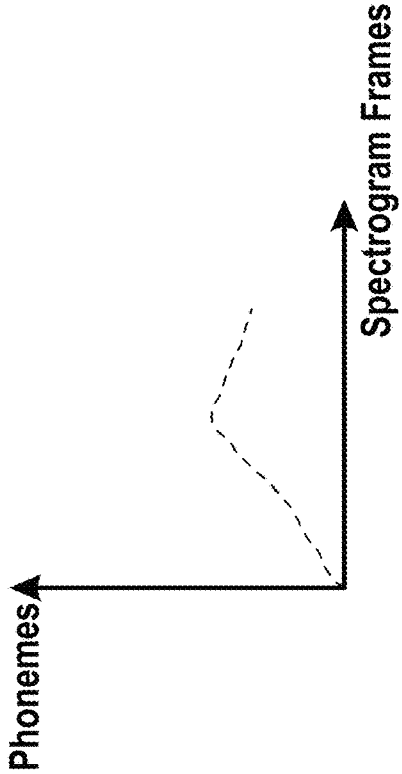
Figure 10C:
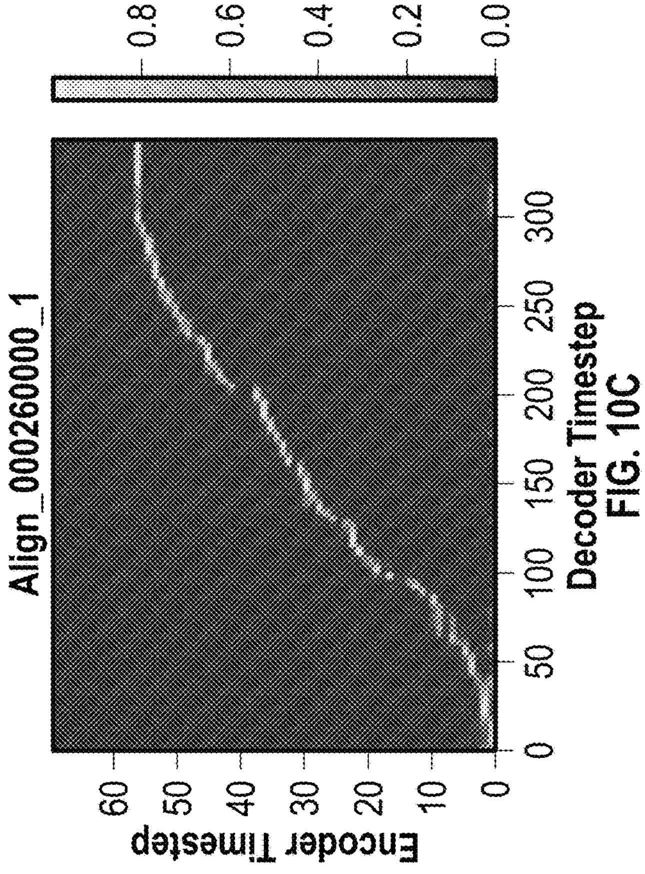
Figure 10D:
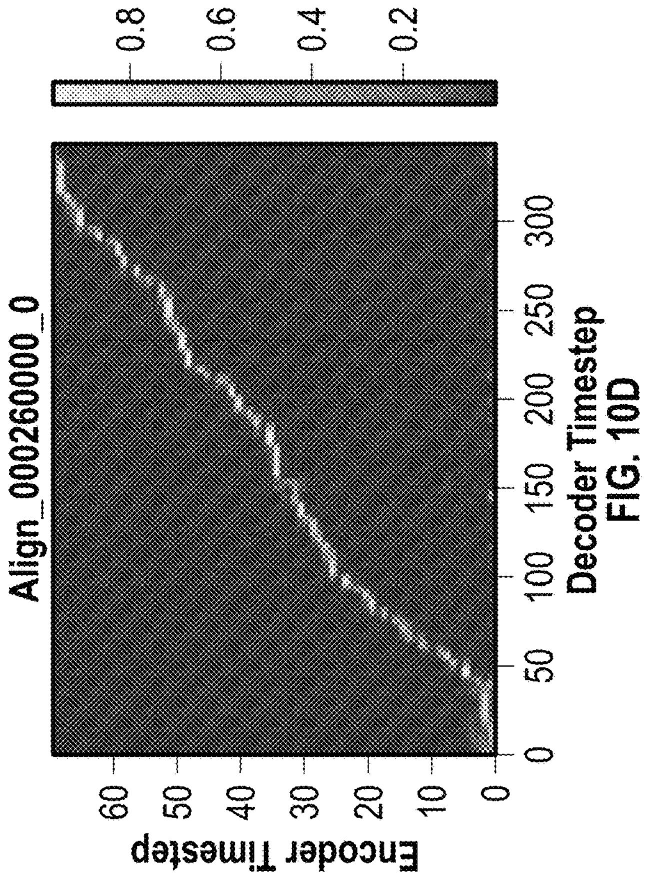

FIG. 9 shows a flowchart delineating the steps involved in using the attention weights to calculate an attention metric/score as a means of judging model quality. In step S901, a large test sentence dataset is inputted into the trained model. During inference, each sentence is passed through the model in sequence, one at a time.

In step S902, the attention weights are retrieved from the model for the current test sentence and its corresponding generated speech. This matrix of weights shows the strength of the connections between the input tokens (current test sentence broken down into linguistic units) and the output tokens (corresponding generated speech broken down into the spectrogram frames).

In step S903, the attention metric/score is calculated using the attention weights pulled from the model. In this embodiment, there are two metrics/scores that can be calculated from the attention mechanism: the 'confidence' or the 'coverage deviation'.

The first attention metric in this embodiment consists of measuring the confidence of the attention mechanism over time. This is a measure of how focused the attention is at each step of synthesis. If, during a step of the synthesis, the attention is focused entirely on one input token (linguistic unit) then this is considered maximum "confidence" and signifies a good model. If the attention is focused on all the input tokens equally then this is considered minimum "confidence". Whether the attention is "focused" or not can be derived from the attention weights matrix. For a focused attention, a large weighting value is observed between one particular output token (mel frame) and one particular input token (linguistic unit), with small and negligible values between that same output token and the other input tokens. Conversely, for a scattered or unfocused attention, one particular output token would share multiple small weight values with many of the input tokens, in which not one of the weighting values especially dominates the others.

In an embodiment, the attention confidence metric, which is sometimes referred to as "Absentmindedness", is measured numerically by observing the alignment, $\alpha_t$, at decoder step t, which is a vector whose length is equal to the number of encoder outputs, I, (number of phonemes in the sentence) and whose sum is equal to 1. If $\alpha_{ti}$ represents the ith element of this vector, i.e. the alignment with respect to encoder output, then the confidence is calculated using a representation of the entropy according to:

$$-\frac{1}{I}\sum_i \alpha_{ti}\log\alpha_{ti}. \quad \text{Equation (1)}$$

Here a value of 0.0 represents the maximum confidence and 1.0 minimum confidence. To obtain a value for the whole sentence, it is necessary to take the sum over all the decoder steps t and divide by the length of the sentence to get the average attention confidence score, or alternatively take the worst case, i.e. largest value. It is possible to use this metric to find periods during the sentence when the confidence is extremely low and use this to find possible errors in the output.

Another metric, coverage deviation, looks at how long each input token is attended to during synthesis. Here, an input token being 'attended to' by an output token during synthesis means the computation of an output token (acoustic units/mel spectrograms) is influenced by that input token. An output token attending to an input token will show itself as a weighting value close to one within the entry of the attention matrix corresponding to those two tokens. Coverage deviation simultaneously punishes the output token for attending too little, and attending too much, to the linguistic unit input tokens over the course of synthesis. If a particular input token is not attended to at all during synthesis, this may correspond to a missing phoneme or word; if it is attended to for a very long time, it may correspond to a slur or repeated syllable/sound.

In an embodiment, the coverage deviation is measured numerically by observing the attention matrix weightings, and summing over the decoder steps. This results in an attention vector, β, whose elements, $\beta_i$, represent the total attention for linguistic unit input token i during the synthesis. There are various methods for analysing this attention vector to look for errors and to produce metrics for judging model quality. For example, if the average total attention for all encoder steps, $\bar{\beta}$ is known, deviations from this average can be found by using a coverage deviation penalty such as $$\log(1+(\bar{\beta}-\beta_i)^2). \qquad \text{Equation (2)}$$

Here, if $\beta_i=\bar{\beta}$ then then the metric scores 0 and represents "perfect" coverage. If, however, $\beta_i$ is greater or smaller than $\bar{\beta}$ then the metric score is a positive value that increases on a logarithmic scale with larger deviations from the average total alignment. If the particular phoneme that input token i represents is known, then different values of the perfect total attention for each encoder, i.e. $\bar{\beta}_i$, can be used to get a more accurate measure. The perfect average coverage for a given phoneme may also depend on the speech rate of the actor, detailed analysis of a particular actor's speech rate can be used to improve the values of $\bar{\beta}_i$, further to get more accurate measures. From the above, a score can be derived for each sentence using Equation (1) or Equation (2).

In an embodiment, in step S911, it is then determined if it is necessary to obtain further training data for the model. This can be done in a number of ways, for example, on receipt of one poor sentence from S903.

In a further embodiment, the scores each sentence are averaged across a plurality of sentences and these are then compared with a threshold, (for example, a value of 0.1 for attention confidence, and 1.0 for coverage deviation). If the score is above the threshold then the system determines in step S911 that the model requires further training.

In further embodiments, the above metric may be combined with one or more other metrics that will be discussed with reference to FIG. 12.

In step S214, targeted training text is determined from the sentences that have had poor scores in S209. In embodiments that will be described later, multiple metrics will be determined for each sentence and these will be compared as will be described later.

At step S913, the system then requests further audio data from the actor. However, instead of sending the actor random further sentences to read, the system is configured to send targeted sentences which are targeted to address the specific problems with the acoustic model.

In one simple embodiment, the actor could be sent to the sentences in S215 that were judged to be bad by the system. However, in other methods further sentences are generated for the actor to speak which are similar to the sentences that gave poor results.

If it is determined that no further training is needed, then testing is finished in step S917.

Methods in which the attention mechanism quality can be numerically acquired have been described. It is further possible to acquire a qualitative view of the attention model quality via plotting the alignment of the attention mechanism, thereby granting a snapshot view of the attention weights for the during the synthesis of each sentence. FIGS. 10(*a*) to 10(*d*) show various examples of the attention alignment being plotted. The x-axis represents the Mel spectrogram frames progressing through time, thereby representing the movement through speech synthesis from start to finish. The y-axis is a vector representation of the phonemes in the order that they appear in the sentence. When a sentence is passed through the model, the encoder returns a vector embedding for each phoneme in that sentence which corresponds to the vector embedding of that phoneme, however the model is not strictly constrained as such to do this, but generally does. Various aspects of the attention mechanism's quality can be inferred from the plots.

First, how focused the attention mechanism is can be inferred from the plots. Focused attention is represented by a sharp, narrow line, as can be seen in FIG. 10(*c*). Focused attention represents the situation in which only a singular encoder output, on the y-axis, is attended to per Mel spectrogram frame. Conversely, unfocused attention would not resemble a sharp line, but would rather be a series of broad Gaussians (spread across the y-axis), as shown in FIG. 10(*d*). The series of Gaussians shows that each phoneme is being attended to by multiple spectrogram frame outputs, i.e. it is unfocused. Unfocused attention such as this will lead to speech intelligibility in the synthesised signal.

Secondly, a well-functioning attention mechanism in which synthesis ends correctly, can be also be inferred form the plots. A well-functioning attention mechanism is represented by a steady linear line as shown in FIG. 10(*a*). The y-axis is time ordered like the x-axis in the sense that it represents the order in which the phonemes appear in the sentence and therefore the order in which they should be said in the resulting speech output. Therefore, as the model progresses through the output of the spectrogram frames, the resulting speech should be progressing through the corresponding phonemes of the input text sentence—this displays itself as a linear line on the plot. Conversely, a poor-functioning attention mechanism would be represented by FIG. 10(*b*). Here, the steady linear line collapses into a negative slope. This shows that the outputted speech begins to repeat part of the sentence backwards, which would sound like gibberish.

In an embodiment, the third metric utilises a concept termed Robustness based on the presence or absence of a stop token. This test is designed to determine the probability that a trained Tacotron model will reach the synthesis length limit rather than end in the correct manner, which is to produce a stop-token. A stop-token is a command, issued to the model during active synthesis, that instructs the model to end synthesis. A stop-token should be issued when the model is confident that it has reached the end of the sentence and thus speech synthesis can end correctly. Without the issue of a stop-token, synthesis would continue, generating "gibberish" speech that does not correspond to the inputted text sentence. The failure for the synthesis to end correctly may be caused by a variety of different errors, including a poorly trained stop-token prediction network, long silences or repeating syllables and unnatural/incorrect speech rates.

The stop-token is a (typically single layer) neural network with a sigmoid activation function. It receives an input vector, $v_s$, which in the Tacotron model is a concatenation of the context vector and the hidden state of the decoder LSTM. Let $W_s$ be the weights matrix of a single later stop-token network. If the hidden state of the LSTM is of dimension $N_L$ and the dimension of the context vector is $N_C$ then the dimension of the projection layer weight matrix, $W_s$, is:

$$(N_L+N_C)\times 1$$

and the output of the layer is computed according to, $$\sigma(W_s \cdot v_s+b_s)$$

where σ is the sigmoid function and the rest of the equation equates to a linear transformation that ultimately projects the concatenated layers down to a scalar. Since the final dimension of the weights vector is 1, the result of $W_s \cdot v_s$ is a scalar value and therefore, due to the sigmoid activation function, the output of this layer is a scalar value between 0 and 1. This value is the stop-token and represents the probability that inference has reached the end of the sentence. A threshold is chosen, such that if the stop-token is above this threshold then inference ceases. This is the correct way for synthesis to end. If, however, this threshold is never reached, then synthesis ends by reaching the maximum allowed number of decoder steps. It is this failure that the robustness check measures.

To compute the robustness metric, the process takes a trained model and synthesizes a large number, typically $N_S$=10000 sentences, and counts the number of sentences $N_F$ that end inference by reaching the maximum allowed number of decoder steps, i.e. fail to produce a stop token. The robustness score is then simply the ratio of these two numbers, $N_F/N_S$. The sentences are chosen to be sufficiently short such that, if the sentence were rendered correctly, the model would not reach the maximum allowed number of decoder steps.

Figure 11:
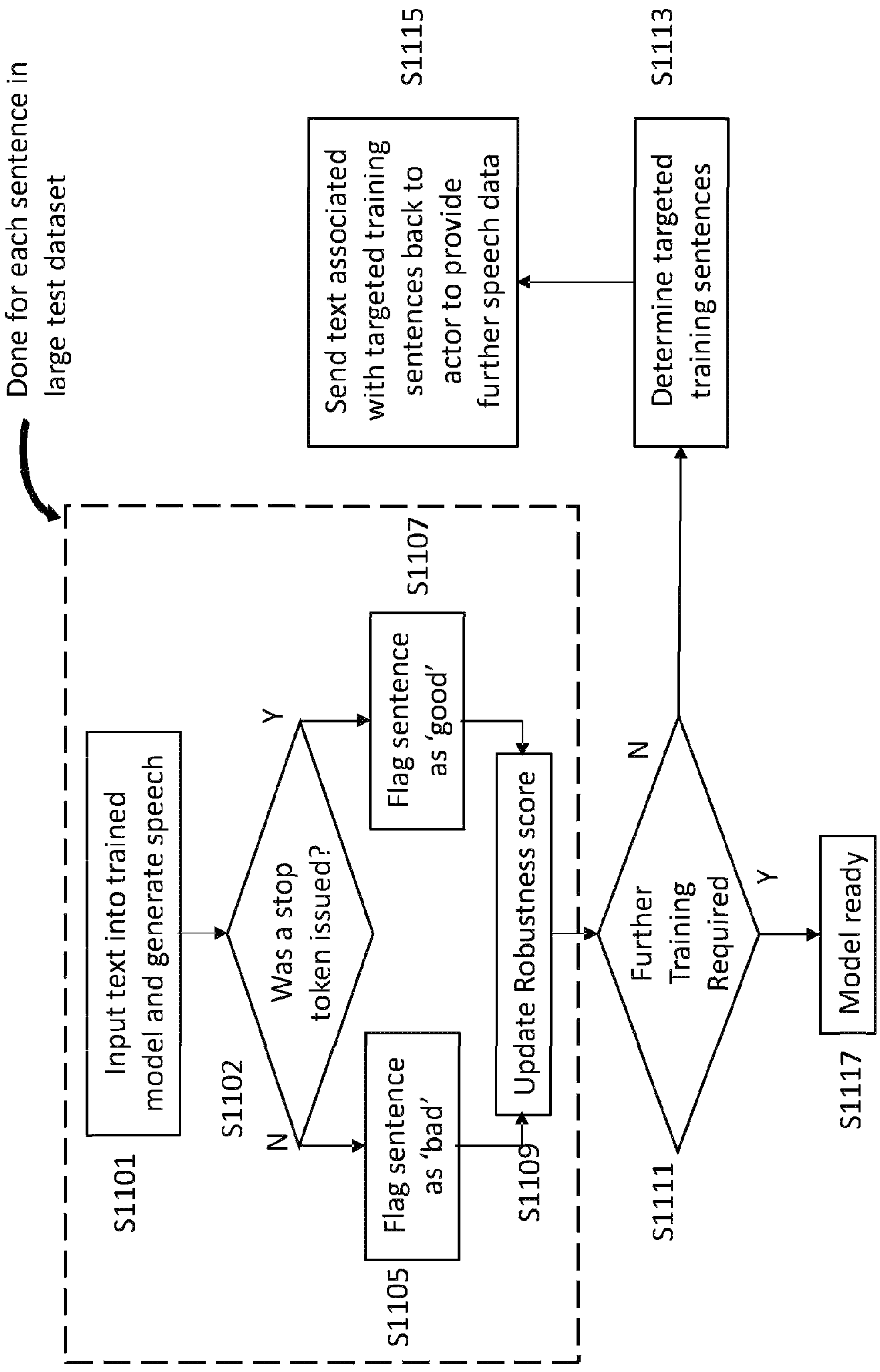
FIG. 11 is a flow chart depicting a method of testing the speech synthesis model and sending targeted training sentences back to the actor in accordance with a further embodiment.

In a further embodiment, stop tokens are used to assess the quality of the synthesis. FIG. 11 displays a flowchart delineating the steps involved in utilising robustness and a stop-token metric as a means of judging model quality. Initially, in step S1101, the large test sentence dataset is inputted into the trained model. During inference, each sentence is passed through the model in sequence.

In step S1102 it is then determined whether during the sentence's inference a stop token was issued, in other words, whether the gate confidence ever exceeded the given threshold. If a stop token was issued, implying that the generated speech is of good quality and ended appropriately, then that sentence is flagged as 'good' in step S1107. Conversely, if a stop token was never issued before the hard limit/fixed duration, implying the presence of 'gibberish speech' at the end of the generated audio, then the sentence is flagged as 'bad' in step S1105.

In step S1109, the robustness score is updated based upon the new 'good' or 'bad' sentence. Once all of the large test sentence dataset has passed through inference, and the final robustness score has thus been calculated, then the process moves onto step S1111 in which it is determined if further training is required.

In one embodiment, it is determined that further training is required if the robustness score is above a certain threshold (for example, a threshold value of 0.001 or 0.1% can be used such that only 1 in 1000 of the sentences fail to produce a stop token). If the robustness is greater than the threshold, thus implying good model quality, then the model is determined to be ready in S1117. Contrariwise, if the robustness is lower than the required threshold the process continues to step S1113. Here, the previously flagged 'bad' sentences are collated into a set of targeted training sentences. In step S1115, the text associated with the targeted training sentence text-audio pairs are sent back to the actor via the app in order to provide further speech data for the specific sentences within the targeted training sentences—thereby improving the quality of the training dataset in order to eventually retrain the model and improve its inference quality.

In further embodiments, the robustness is used with the other metrics to determine if further training is required.

The above embodiments have discussed using the various metrics independent of one another. However, in the final embodiment, these are combined.

In an embodiment, once all the relevant metrics have been computed, they are aggregated into a single metric using one or more methods. The worst scoring sentences in this metric are the ones that are sent back to the actor to be re-recorded first. It is not necessary to send back a selected number of sentences; it is preferable to order the sentences in a hierarchy so that the worst scoring ones can have priority in being sent back to the actor. This process of re-recording the sentences ends when the model is deemed "good-enough", which occurs when the average of each of the metrics falls below set thresholds.

The different approaches that can be utilised for aggregating the numerous metrics will be described below. The embodiment is not limited to the following methods, they are merely examples and any sufficient method of combining the metrics can be used.

One possible approach to combine the metrics into a single aggregate score for each sentence is to use a set of thresholds, a unique threshold for each separate metric, and then use a simple voting system. The voting system consists of allocating a sentence a score of 1 if they cross the threshold of a metric (fail), and 0 if they don't (pass). This is done for each metric separately so that each sentence has a total score that essentially represents the number of metrics that sentence failed. For example, if the metrics being considered are the transcription, attention, and robustness metrics disclosed previously, then each sentence will have a score ranging from 3 (failed all metrics) to 0 (passed all metrics).

A second possible approach to combine the metrics into a single aggregate score for each sentence is to rank order the sentences by their performance on each metric, giving a continuous score representing performance for each metric rather than the binary pass/fail previously described. For example, 2000 sentences can be synthesised, these can then be ordered by how well they did on the transcription metric, and attention metrics and assigned a value according to its position for each metric i.e. 0 for best and 1999 for worst. These rankings can then be added together, e.g. if a sentence ranks at position 1 on the transcription metric and position 1500 on the attention metric, then it's overall score is 1501. Since it is not possible to assign a continuous performance score with the robustness metric (the stop token is either issued or it is not at all), then typically a fixed value can be added if a sentence fails the robustness test, which is usually half the number of sentence synthesised, i.e. 1000 in this case. Therefore, if the sentence that scored 1501 failed the robustness test too its final score would be 2501. Once this aggregated score has been computed for each sentence individually, then the sentences can be ordered best to worst scoring and the worst will be sent back to the actor for re-recording.

Figure 12:
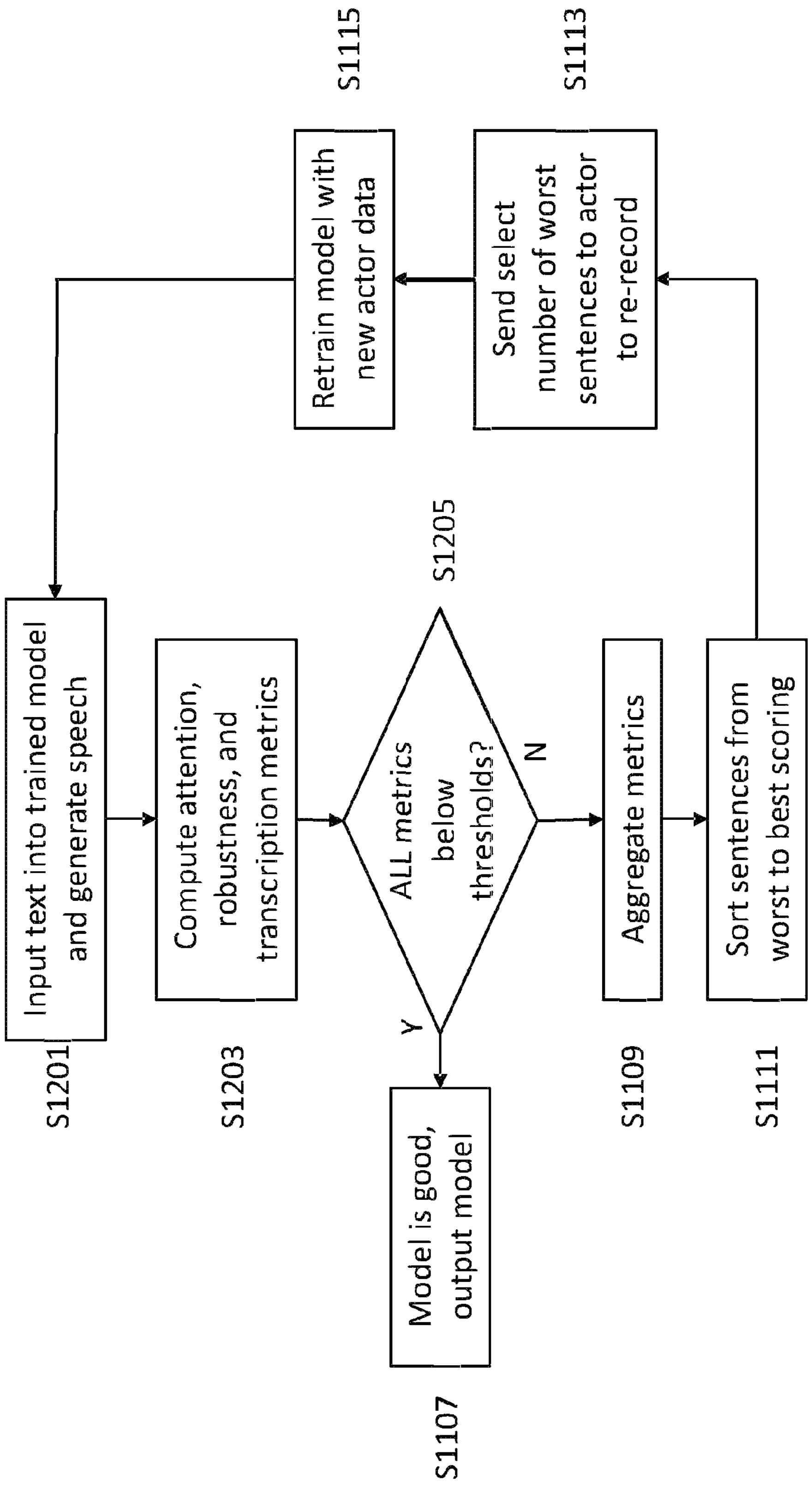
FIG. 12 is a flow chart depicting a method of testing the speech synthesis model and sending targeted training sentences back to the actor in accordance with a further embodiment.

FIG. 12 summaries the overall process in which all of the disclosed metrics are used to judge model quality. In step S1201 a large dataset of test sentences is inputted into the trained model to be tested. In step S1203, the metrics are all computed individually as explained previously (for example, the output of step S209 of FIG. 7, S903 of FIGS. 9 and S1109 of FIG. 11). At this point, in step S1205, if all three of the metrics, averaged across all sentences, are below their thresholds simultaneously then the model is judged to be good and is determined to be ready in step S1117. Alternatively, if any of the three metrics are above their threshold, this suggests that the model is still under performing in the area indicated by the metric, therefore the process continues in order to improve the quality of the model.

First, in step S1109, the various metrics are aggregated into a single score for each sentence that can be used to order the sentences from worst scoring to best scoring in step S1111. In step S1113, a selected number of sentences are sent back to the actor so that new speech data can be recorded. The number of sentences sent back depends on how many the actor can record, for example the actor may have the time for a session long enough to accommodate 500 new recordings. In that case, the 500 worst sentences in order of priority (worst have the highest priority) are sent back to the actor. Finally, in step S1115, the model is retrained using the new speech data provided by the actor, and the model is then tested once again using the same large dataset of test sentences until the process results in a model good enough to output.

The above description has presumed that training data is provided as sentence (or other text sequences) with corresponding speech. However, the actor could provide a monologue. For this, an extra step is added to the training of subdividing the monologue audio into sentences and matching these with the text to extract individual sentences. In theory, this can be done without manual supervision. However, in practice, this is usually done with a semi-automated approach.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A computer implemented method for training a speech synthesis model, wherein the speech synthesis model is adapted to output speech in response to input text, the method comprising:

receiving training data for training the speech synthesis model, the training data comprising speech that corresponds to known text;

training the speech synthesis model;

testing the speech synthesis model using a plurality of text sequences including, for each text sequence of the plurality of text sequences:

calculating a plurality of metrics, each of the plurality of metrics indicating a performance of the speech synthesis model when synthesizing each text sequence, wherein the plurality of metrics comprises a first metric derived from an output of the speech synthesis model and a second metric that is based on an evaluation of an intermediate output of the speech synthesis model;

determining whether further training is needed for each of the plurality of metrics;

determining targeted training text, wherein the targeting training text is text related to text sequences where at least one of the plurality of metrics indicated that the speech synthesis model required further training; and outputting the determined targeted training text with a request for speech corresponding to the targeted training text;

wherein the speech synthesis model comprises an attention network and the second metric that is based on the evaluation of the intermediate output is derived from the attention network for an input sentence.

2. A computer implemented method according to claim 1, further comprising determining whether the speech synthesis model requires further training, including combining the at least one metric over a plurality of text sequences and determining whether the combined metric is below a threshold.

3. A computer implemented method according to claim 1, wherein the first metric is calculated from the output of the synthesis by:

for each text sequence inputted into the speech synthesis model, providing corresponding output speech into a speech recognition module to determine a transcription; and comparing the transcription with that of the original input text sequence.

4. A computer implemented method according to claim 3, wherein the transcription and the original input text sequence are compared using a distance measure.

5. A computer implemented method according to claim 1, wherein the second metric comprises a measure of confidence of an attention mechanism over time or coverage deviation.

6. A computer implemented method according to claim 1, wherein the second metric is a presence or an absence of a stop token in the synthesized output.

7. A computer implemented method according to claim 6, wherein the presence or absence of the stop token is used to determine a robustness of the speech synthesis model, wherein the robustness is determined based on a number of text sequences for which the stop token was not generated during synthesis divided by a total number of sentences.

8. A computer implemented method according to claim 7, the plurality of metrics comprising the robustness, a metric derived from an attention network of the speech synthesis model and a transcription metric, wherein a text sequence is inputted into the speech synthesis model and corresponding output speech is passed through a speech recognition module to obtain a transcription and the transcription metric is a comparison of the transcription with the original text sequence.

9. A computer implemented method according to claim 8, wherein each metric is determined over a plurality of test sequences and compared with a threshold to determine if the speech synthesis model requires further training.

10. A computer implemented method according to claim 9, wherein, in accordance with determining that the speech synthesis model requires further training, a score is determined for each text sequence by combining the scores of a plurality of metrics for each text sequence and the text sequences are ranked in order of performance.

11. A computer implemented method according to claim 10, wherein a recording time is determined for recording further training data and n text sequences that performed worst are sent as the targeting training text, wherein n is selected as the number of text sequences that are estimated to take the recording time to record.

12. A computer implemented method according to claim 1, wherein the training data comprises speech corresponding to distinct text sequences.

13. A computer implemented method according to claim 12, wherein the training data is received and matched with the distinct text sequences for training.

14. A computer implemented method according to claim 1, wherein the training data comprises speech corresponding to a text monologue.

15. A computer implemented method according to claim 1, wherein the training data is received from a remote terminal and outputting of the targeted training text comprises sending the determined targeted training text to the remote terminal.

16. A non-transitory computer-readable storage medium storing one or more programs configured for execution by a computer system, the one or more programs comprising a set of operations, including:

receiving training data for training a speech synthesis model, the training data comprising speech that corresponds to known text;

training the speech synthesis model;

testing the speech synthesis model using a plurality of text sequences including, for each text sequence of the plurality of text sequences:

calculating a plurality of metrics, each of the plurality of metrics indicating a performance of the speech synthesis model when synthesizing each text sequence, wherein the plurality of metrics comprises a first metric derived from an output of the speech synthesis model and a second metric that is based on an evaluation of an intermediate output of the speech synthesis model;

determining whether further training is needed for each of the plurality of metrics;

determining targeted training text, wherein the targeting training text is text related to text sequences where at least one of the plurality of metrics indicated that the speech synthesis model required further training; and outputting the determined targeted training text with a request for speech corresponding to the targeted training text;

wherein the speech synthesis model comprises an attention network and the second metric that is based on the evaluation of the intermediate output is derived from the attention network for an input sentence.

17. A system for training a speech synthesis model, the system comprising a processor and memory, the speech synthesis model being stored in memory and being adapted to output speech in response to input text, the processor being adapted to perform a set of operations, comprising:

receiving training data for training the speech synthesis model, the training data comprising speech that corresponds to known text;

training the speech synthesis model;

testing the speech synthesis model using a plurality of text sequences including, for each text sequence of the plurality of text sequences:

calculating a plurality of metrics, each of the plurality of metrics indicating a performance of the speech synthesis model when synthesizing each text sequence, wherein the plurality of metrics comprises a first metric derived from an output of the speech synthesis model and a second metric that is based on an evaluation of an intermediate output of the speech synthesis model;

determining whether further training is needed for each of the plurality of metrics;

determining targeted training text, wherein the targeting training text is text related to text sequences where at least one of the plurality of metrics indicated that the speech synthesis model required further training; and outputting the determined targeted training text with a request for speech corresponding to the targeted training text;

wherein the speech synthesis model comprises an attention network and the second metric that is based on the evaluation of the intermediate output is derived from the attention network for an input sentence.

* * * * *